United States Patent
Kurosawa

(10) Patent No.: US 12,320,096 B2
(45) Date of Patent: Jun. 3, 2025

(54) SHOVEL AND SHOVEL ASSIST SYSTEM

(71) Applicant: SUMITOMO CONSTRUCTION MACHINERY CO., LTD., Tokyo (JP)

(72) Inventor: Ryota Kurosawa, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 817 days.

(21) Appl. No.: 17/241,261

(22) Filed: Apr. 27, 2021

(65) Prior Publication Data

US 2021/0246631 A1  Aug. 12, 2021

Related U.S. Application Data

(63) Continuation of application No. PCT/JP2019/042896, filed on Oct. 31, 2019.

(30) Foreign Application Priority Data

Oct. 31, 2018 (JP) .................. 2018-205906

(51) Int. Cl.
*G06N 20/00* (2019.01)
*E02F 9/20* (2006.01)
(Continued)

(52) U.S. Cl.
CPC .............. *E02F 9/2004* (2013.01); *E02F 9/24* (2013.01); *E02F 9/26* (2013.01); *G06N 20/00* (2019.01); *G06T 7/0004* (2013.01)

(58) Field of Classification Search
None
See application file for complete search history.

(56) References Cited

U.S. PATENT DOCUMENTS 10,323,386 B2   6/2019  Kiyota et al.
2012/0053703 A1*  3/2012  Nettleton ............... E21C 41/26
                                                    700/9

(Continued)

FOREIGN PATENT DOCUMENTS

EP    0990739     4/2000
JP    H11-116185  4/1999
(Continued)

OTHER PUBLICATIONS

International Search Report for PCT/JP2019/042896 mailed on Dec. 24, 2019.

*Primary Examiner* — Peter D Nolan
*Assistant Examiner* — Jacob Kent Besteman-Street
(74) *Attorney, Agent, or Firm* — IPUSA, PLLC

(57) ABSTRACT

A shovel includes a processor, and a memory storing program instructions that cause the processor to obtain environmental information around the shovel, and perform determination related to an object around the shovel based on the obtained environmental information, by using a learned model on which machine learning has been performed. The learned model is updated to an additionally learned model on which additional learning has been performed based on teaching information generated from the obtained environmental information. In a case where the learned model is updated, the processor performs the determination based on the obtained environmental information, by using the updated learned model.

19 Claims, 10 Drawing Sheets

(51) Int. Cl.
*E02F 9/24* (2006.01)
*E02F 9/26* (2006.01)
*G06T 7/00* (2017.01)

(56) References Cited

U.S. PATENT DOCUMENTS

| | | | |
|---|---|---|---|
| 2012/0124098 A1* | 5/2012 | Damm | G06N 5/02 |
| | | | 707/E17.098 |
| 2013/0006484 A1* | 1/2013 | Avitzur | G05D 1/0274 |
| | | | 701/50 |
| 2014/0052349 A1 | 2/2014 | Tsukane | |
| 2015/0199617 A1 | 7/2015 | Kuwajima | |
| 2016/0129913 A1* | 5/2016 | Boesen | G06Q 20/3224 |
| | | | 705/40 |
| 2018/0209122 A1* | 7/2018 | Kiyota | E02F 9/26 |
| 2018/0258616 A1* | 9/2018 | Kiyota | G06T 1/00 |
| 2019/0109483 A1* | 4/2019 | Huo | H02J 7/04 |
| 2019/0171208 A1* | 6/2019 | Magalhães de Matos | |
| | | | G06N 20/00 |
| 2019/0241124 A1* | 8/2019 | Izumikawa | G08B 21/24 |
| 2019/0251471 A1* | 8/2019 | Morita | G06F 16/583 |
| 2019/0378410 A1* | 12/2019 | Cho | G08G 1/0141 |
| 2020/0005094 A1* | 1/2020 | Sinha | G06V 30/422 |
| 2020/0050890 A1* | 2/2020 | Aizawa | G06V 10/82 |
| 2020/0134355 A1 | 4/2020 | Shinoda et al. | |
| 2020/0202175 A1 | 6/2020 | Hieida et al. | |
| 2020/0354921 A1* | 11/2020 | Nishi | E02F 3/32 |
| 2020/0364953 A1* | 11/2020 | Simoudis | B60W 60/001 |
| 2021/0124364 A1* | 4/2021 | Moorehead | G05D 1/0214 |
| 2022/0049477 A1* | 2/2022 | Yamanaka | E02F 9/2228 |

FOREIGN PATENT DOCUMENTS

| | | | |
|---|---|---|---|
| JP | 2003-316746 | 11/2003 | |
| JP | 2004-343297 | 12/2004 | |
| JP | 2006-188353 | 7/2006 | |
| JP | 2015-135552 | 7/2015 | |
| JP | 2017-102606 | 6/2017 | |
| JP | 2017-224184 | 12/2017 | |
| JP | 6290497 | 3/2018 | |
| JP | 2018-142756 | 9/2018 | |
| WO | 2012/157603 | 11/2012 | |
| WO | 2017/094627 | 6/2017 | |
| WO | WO-2017094627 A1 * | 6/2017 | E02F 3/36 |
| WO | 2018/020954 | 2/2018 | |
| WO | 2018/084161 | 5/2018 | |
| WO | 2018/180562 | 10/2018 | |

* cited by examiner

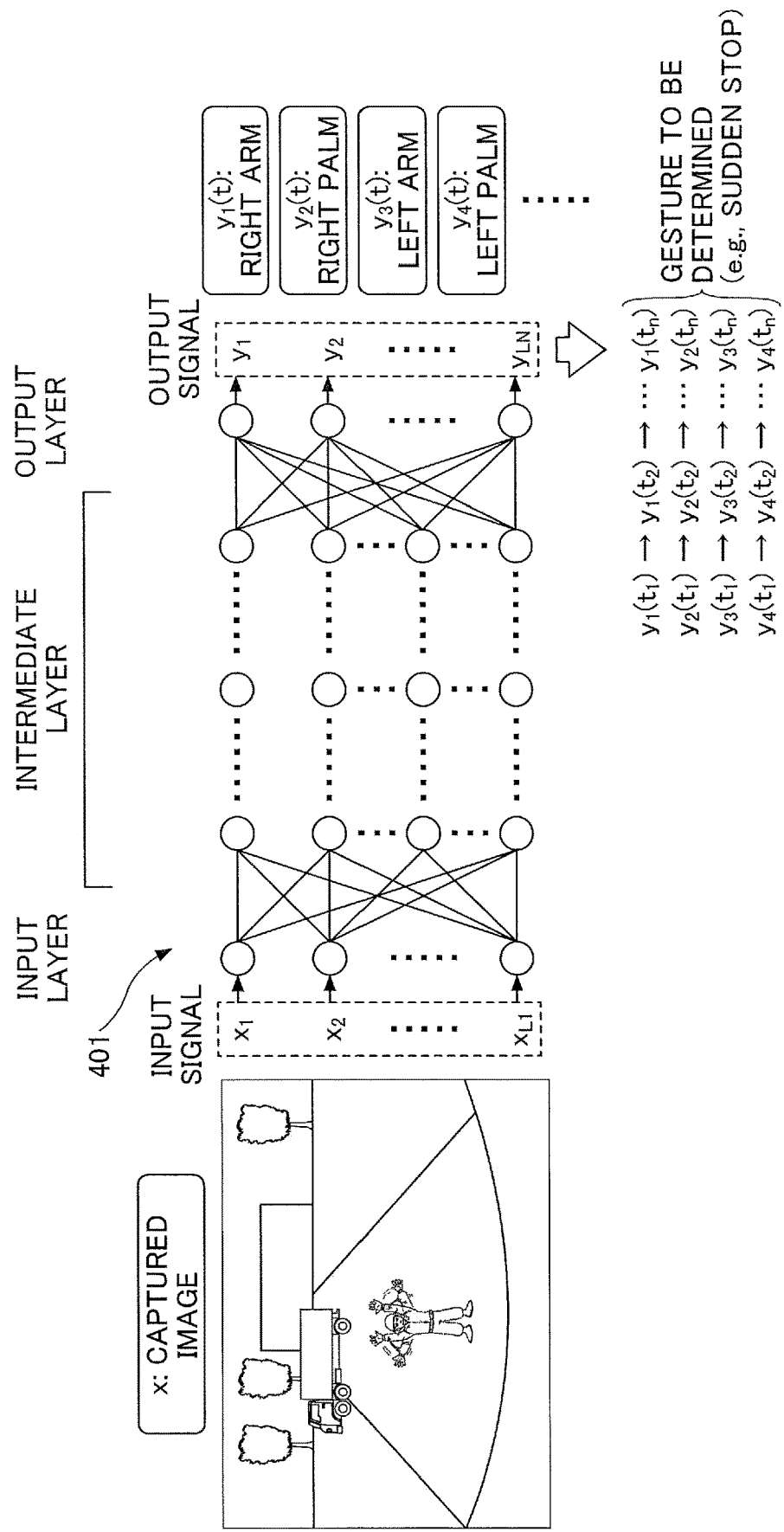

SHOVEL AND SHOVEL ASSIST SYSTEM

RELATED APPLICATION

This application is a continuation of International Application PCT/JP2019/042896, filed on Oct. 31, 2019 and designating the U.S., which is based on and claims priority to Japanese Patent Application No. 2018-205906, filed Oct. 31, 2018. The entire contents of these applications are incorporated herein by reference.

BACKGROUND

1. Technical Field

The present disclosure relates to a shovel and a shovel assist system.

2. Description of Related Art

Based on, for example, environmental information representing a situation around a shovel (e.g., captured images of surroundings of a shovel, reflected wave data of detection waves transmitted around shovel, and the like), a technique of performing determination related to an object around the shovel (e.g., determination of the presence or absence of an object, determination of a type of an object, and the like) is known.

For example, an image processing technique, such as optical flow and pattern matching, is used to detect a surrounding object based on captured images of surroundings of a shovel.

SUMMARY

According to one embodiment of the present disclosure, a shovel includes a processor, and a memory storing program instructions that cause the processor to obtain environmental information around the shovel, and perform determination related to an object around the shovel based on the obtained environmental information, by using a learned model on which machine learning has been performed. The learned model is updated to an additionally learned model on which additional learning has been performed based on teaching information generated from the obtained environmental information. In a case where the learned model is updated, the processor performs the determination based on the obtained environmental information, by using the updated learned model.

According to another embodiment of the present disclosure, a shovel assist system includes a first shovel, a second shovel, and an external device configured to communicate with the first shovel and the second shovel. The first shovel includes a processor, and a memory storing program instructions that cause the processor to obtain environmental information around the first shovel, and perform determination related to an object around the first shovel based on the obtained environmental information around the first shovel, by using a learned model on which machine learning has been performed. The second shovel includes a processor, and a memory storing program instructions that cause the processor to obtain environmental information around the second shovel, record the obtained environmental information around the second shovel, and transmit the recorded environmental information to the external device. The external device includes a processor, and a memory storing program instructions that cause the processor to generate teaching information based on the environmental information obtained at the second shovel, received from the second shovel, perform additional learning on a learned model identical to the learned model used to perform the determination at the first shovel, based on the generated teaching information, to generate an additionally learned model, and transmit, to the first shovel, the additionally learned model on which the additional learning has been performed. The learned model is updated to the additionally learned model received from the external device at the first shovel, and the determination is performed, in a case where the learned model is updated, by using the updated learned model, based on the obtained environmental information around the first shovel.

BRIEF DESCRIPTION OF THE DRAWINGS

FIG. 4B is a schematic diagram illustrating an example of the determining process performed by the determining unit;

DETAILED DESCRIPTION

A shovel may be used in various environments. Determination is performed based on a predetermined determination criterion, and appropriate determination accuracy cannot be maintained depending on environmental conditions.

Therefore, in view of the above-described problem, a technique of improving determination accuracy in performing determination related to an object around a shovel based on environmental information around the shovel under various environmental conditions is provided.

In the following, embodiments will be described with reference to the drawings.

[Overview of a Shovel Assist System]

First, with reference to FIG. 1, a shovel assist system SYS according to the present embodiment will be described.

Figure 1:
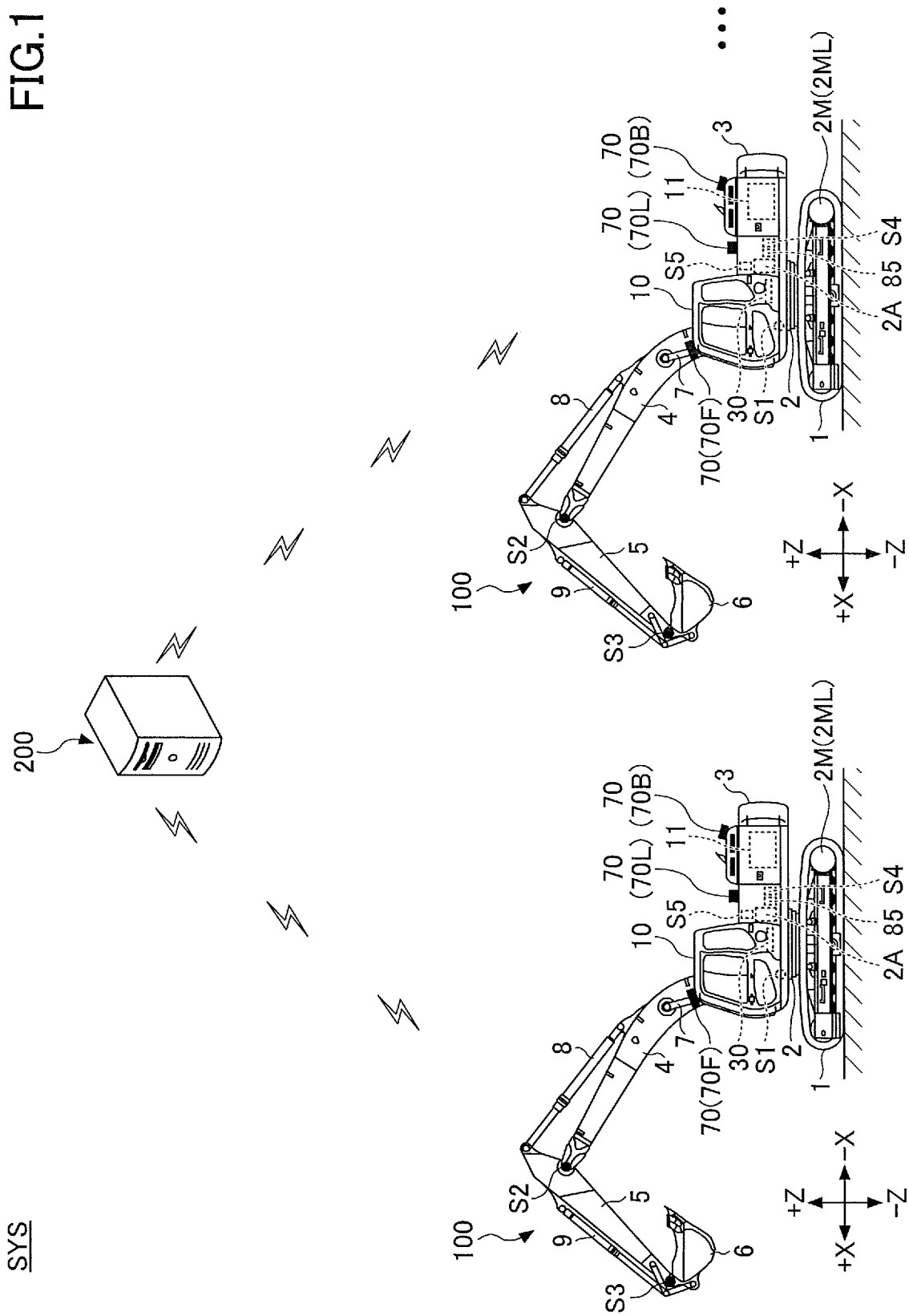
FIG. 1 is a schematic diagram illustrating an example of a shovel assist system.

FIG. 1 is a schematic diagram illustrating an example of a configuration of the shovel assist system SYS.

The shovel assist system SYS includes multiple shovels 100 and a management device 200, and assists determination related to an object around the shovels 100 that is performed by each shovel 100. The determination related to an object around the shovel 100 includes, for example, determination of the presence or absence of an object around the shovel 100 (i.e., determination related to detection of an object around the shovel 100) and determination of a type of an object around the shovel 100 (i.e., determination related to classification of an object detected around the shovel 100). The following description assumes that multiple shovels 100 have the same configuration with respect to the shovel assist system SYS.

<Overview of a Shovel>

The shovel 100 includes a lower traveling body 1, an upper turning body 3 that is pivotably mounted on the lower traveling body 1 through a turning mechanism 2, a boom 4, an arm 5, and a bucket 6 that constitute an attachment, and a cabin 10.

The lower traveling body 1 includes a pair of left and right crawlers 1C, specifically, a left crawler 1CL and a right crawler 1CR. In the lower traveling body 1, the left crawler 1CL and the right crawler 1CR are hydraulically driven by a travel hydraulic motor 2M (2ML and 2MR), respectively, to cause the shovel 100 to travel.

The upper turning body 3 is driven by a turning hydraulic motor 2A to rotate relative to the lower traveling body 1. The upper turning body 3 may be electrically driven by an electric motor instead of being hydraulically driven by the turning hydraulic motor 2A. Hereinafter, for convenience, the side of the upper turning body 3 on which an attachment AT is attached is defined as the front side, and the side of the upper turning body 3 on which a counterweight is attached is defined as the rear side.

The boom 4 is attached to the front center of the upper turning body 3 so as to be vertically pivotable, the arm 5 is attached to the distal end of the boom 4 to be vertically rotatable, and the bucket 6 is attached to the distal end of the arm 5 to be vertically rotatable. The boom 4, the arm 5, and the bucket 6 are hydraulically driven by a boom cylinder 7, an arm cylinder 8, and a bucket cylinder 9, respectively, as hydraulic actuators.

The cabin 10 is a cab where an operator rides that is mounted on the front left side of the upper turning body 3.

Additionally, the shovel 100 includes a communication device 90. The shovel 100 is communicatively connected to the management device 200 through a predetermined communication network (which will be hereinafter simply referred to as the "communication network"), which may include, for example, a cellular telephone network having a base station as a terminal, a satellite communication network utilizing a communication satellite in the sky, the Internet, or the like. This enables the shovel 100 to obtain various information from the management device 200 and transmit various information to the management device 200. Details will be described below.

The shovel 100 operates operating elements (i.e., driven elements), such as the lower traveling body 1, the upper turning body 3, the boom 4, the arm 5, and the bucket 6, in response to an operation of an operator riding on the cabin 10 with respect to an operating device 26.

Additionally, the shovel 100 may be remotely operated by an operator at a predetermined external device (e.g., the management device 200) instead of or in addition to being operated by an operator at the cabin 10. In this case, for example, the shovel 100 transmits image information (i.e., captured images) output by an image capturing device 70, which will be described later, to the management device 200. This enables the operator to remotely control the shovel 100 while checking the image information displayed on a display device provided in the management device 200 (e.g., a display device 230 described below). The shovel 100 may, in accordance with a remote operation signal representing a content of a remote operation, received from the management device 200, operate driven elements, such as the lower traveling body 1, the upper turning body 3, the boom 4, the arm 5, and the bucket 6. The following description assumes that the operation of the operator includes at least one of an operation performed by an operator on the operating device 26 or a remote operation performed by an operator on the management device 200.

<Overview of the Management Device>

The management device 200 (i.e., an example of the external device) is located at a location geographically apart from the shovels 100 outside the shovels 100 and manages the multiple shovels 100. The management device 200 is, for example, a server device (or a terminal device) that is installed in a management center or the like provided outside a work site where the shovel 100 operates, and is mainly configured by one or more server computers or the like. In this case, the server device may be a company-owned server operated by a business operator operating the shovel assist system SYS or a business operator related to the business operator, or may be what is called a cloud server. Additionally, the management device 200 may be a stationary or portable computer terminal disposed at a management office or the like within a work site of the shovel 100.

The management device 200 is communicatively connected to each of the multiple shovels 100 through the communication network. This enables the management device 200 to transmit various information to the shovel 100 and receive various information from the shovel 100. Details will be described below.

The management device 200 may be configured to remotely operate the shovel 100. Specifically, the management device 200 displays the image information of the image capturing device 70, distributed from the shovel 100, on the display device (e.g., the display device 230), and an operator of the remote operation may remotely operate the shovel 100 while checking the image information. In this case, the operator of the remote operation may use an operating device for the remote operation, provided in the management device 200 (e.g., a general-purpose operating device such as a touch panel, a touch pad, a joystick, a dedicated operating device simulating the operating device 26, or the like). The management device 200 transmits a remote operation signal, including a content of the remote operation, to the shovel 100 through the communication network. This enables the shovel 100 to operate, for example, under the control of a controller 30 described below, in response to the remote operation signal from the management device 200, and the management device 200 can assist the remote operation of the shovel 100.

[Example of a Configuration of the Shovel Assist System]

With reference to FIGS. 2 to 5 in addition to FIG. 1, a specific configuration of the shovel assist system SYS (i.e., the shovel 100 and the management device 200) will be described.

Figure 2:
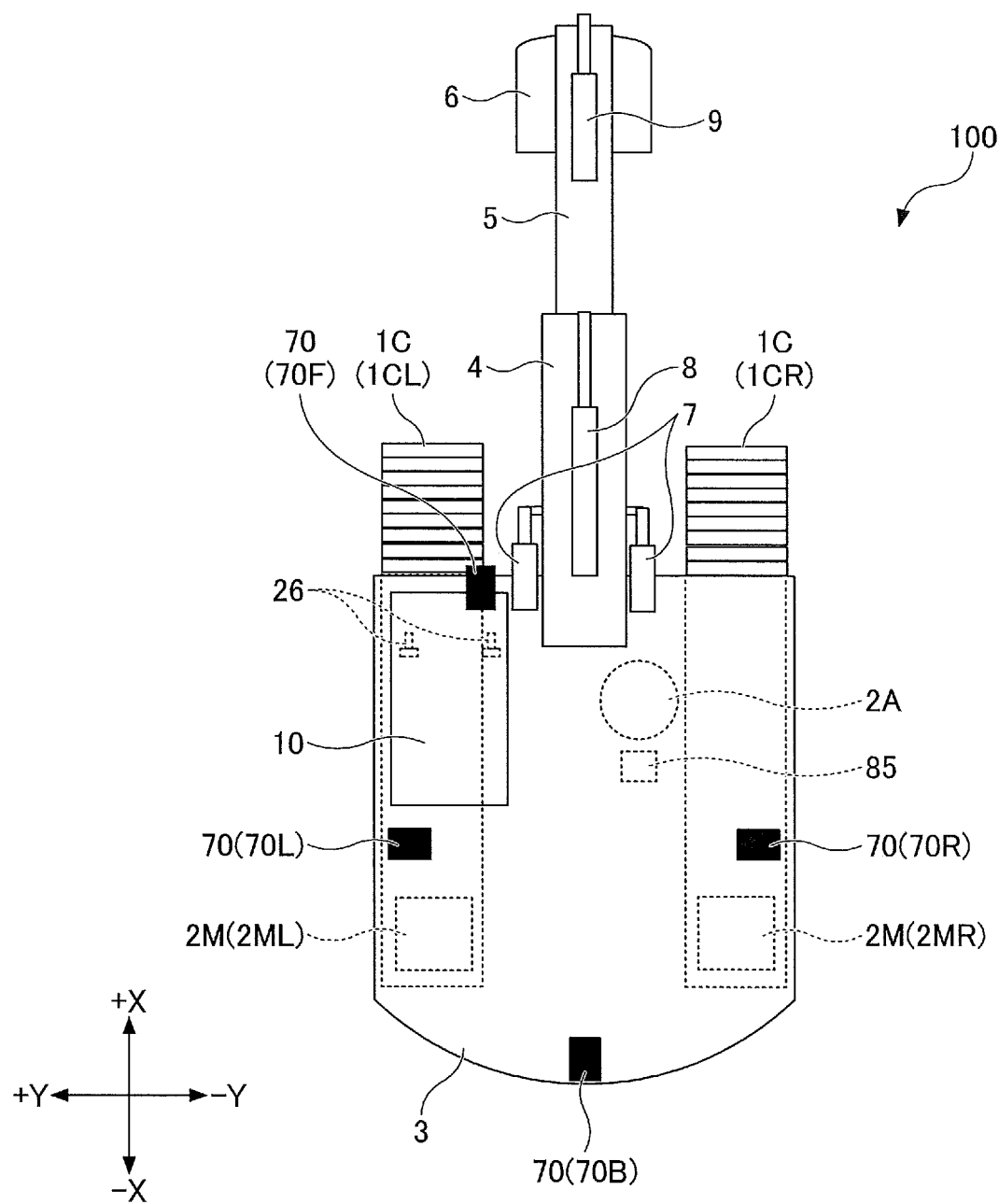
FIG. 2 is a top view of a shovel.
Figure 3:
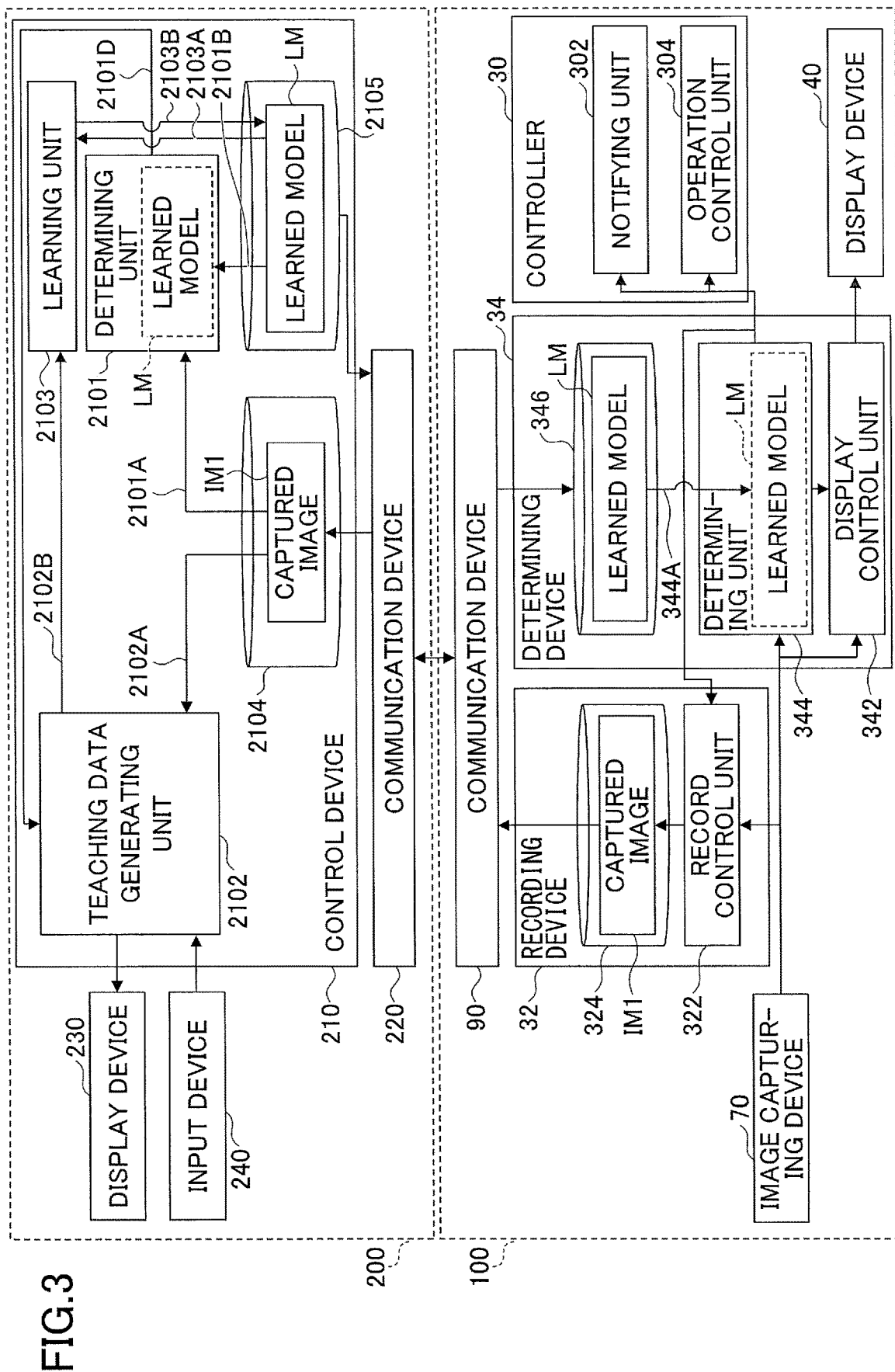
FIG. 3 is a functional block diagram illustrating an example of a functional configuration of the shovel assist system.
Figure 4A:
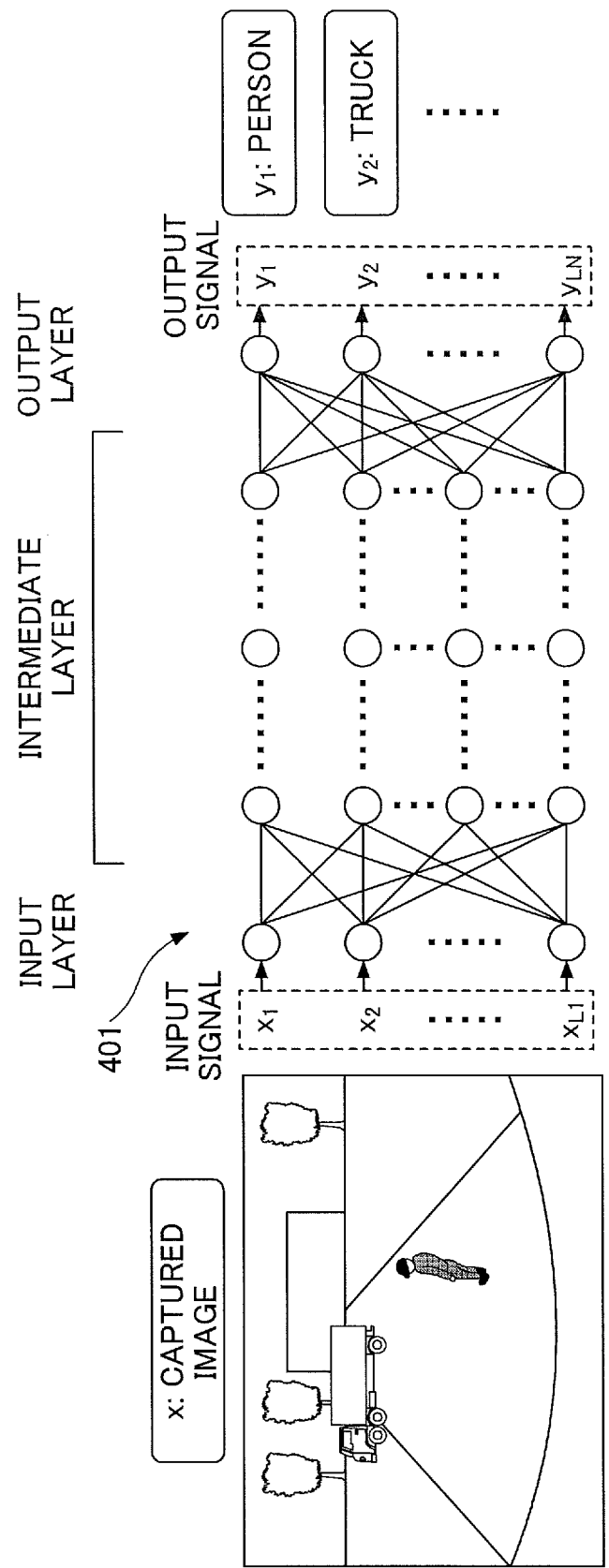
FIG. 4A is a schematic diagram illustrating an example of a determining process performed by a determining unit.
Figure 5:
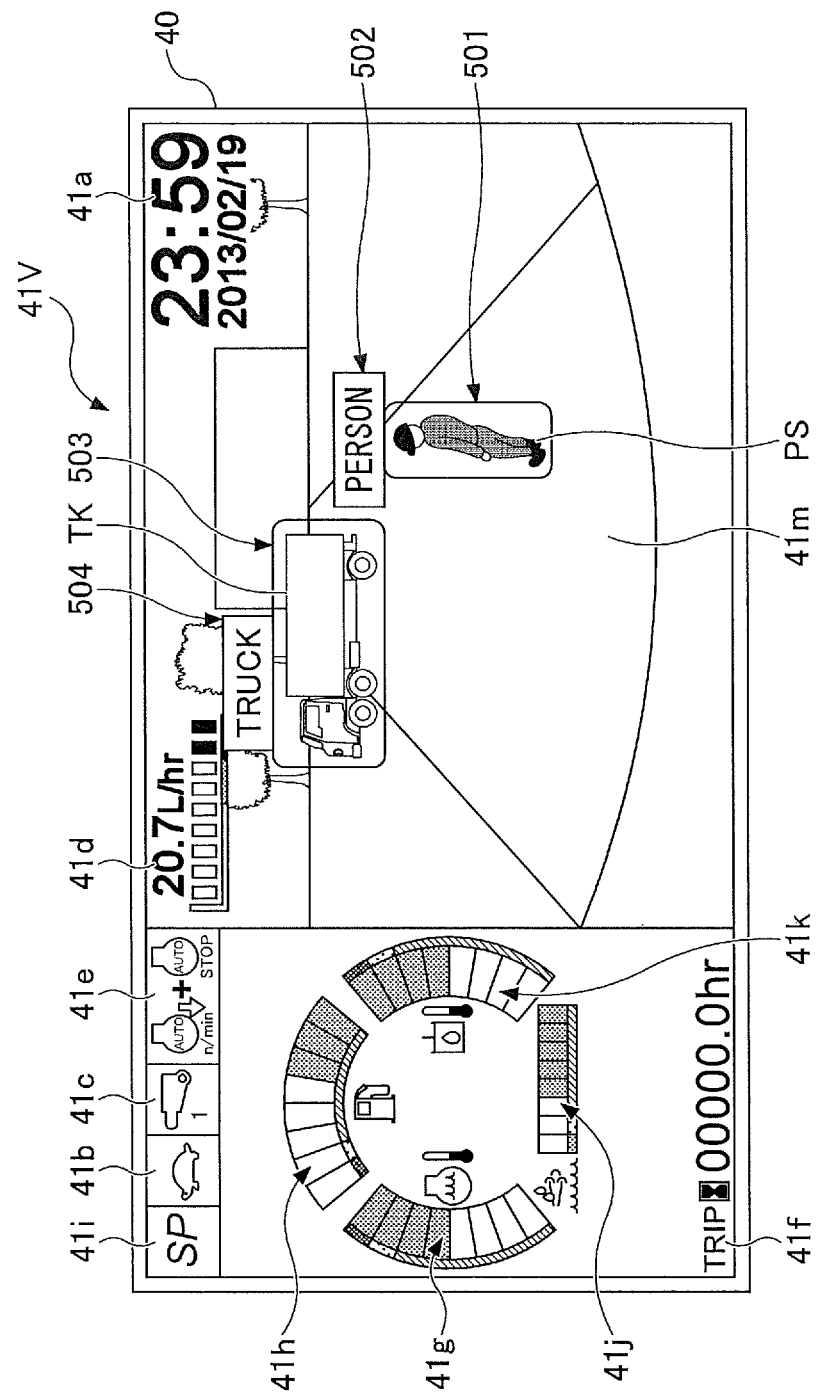
FIG. 5 is a diagram illustrating a specific example of a result of the determining process performed by the determining unit.

FIG. 2 is a top view of the shovel 100. FIG. 3 is a configuration diagram illustrating an example of a configuration of the shovel assist system SYS according to the present embodiment. FIG. 4 (FIG. 4A and FIG. 4B) is a schematic diagram illustrating an example of a determining process performed by a determining unit 344, which will be described later. FIG. 5 is a diagram illustrating a specific example of a result of the determining process performed by the determining unit 344.

As described above, the multiple shovels 100 have the same configuration with respect to the shovel assist system SYS. Thus, in FIG. 3, only a configuration of the single shovel 100 is described in detail.

<Structure of the Shovel>

The shovel 100 includes a hydraulic actuator, such as the travel hydraulic motor 2M (2ML and 2MR), the turning hydraulic motor 2A, the boom cylinder 7, the arm cylinder 8, and the bucket cylinder 9, as described above, as a configuration related to a hydraulic system. Additionally, the shovel 100 includes an engine 11 and the operating device 26 as the configuration related to the hydraulic system. The shovel 100 includes the controller 30, a recording device 32, a determining device 34, a display device 40, the image capturing device 70, an orientation detecting device 85, the communication device 90, a boom angle sensor S1, an arm angle sensor S2, a bucket angle sensor S3, a body tilt sensor S4, and a turning state sensor S5, as a configuration related to a control system.

The engine 11 is a driving source of the hydraulic system of the shovel 100 and is, for example, mounted on the rear of the upper turning body 3. The engine 11 is, for example, a diesel engine using diesel oil as fuel. The engine 11 is operated, for example, to maintain a predetermined rotational speed (i.e., a set rotational speed) under the control of the controller 30. A rotating shaft of the engine 11 is connected to a rotating shaft of a main pump supplying hydraulic oil to the hydraulic actuator and a pilot pump supplying hydraulic oil to hydraulic equipment of an operating system such as the operating device 26, and the power of the engine 11 is transmitted to the main pump and the pilot pump.

The operating device 26 is disposed within a range where an operator or the like, being seated in a driver's seat in the cabin 10, can reach, and an operator or the like inputs an operation to operate various operating elements (such as the lower traveling body 1, the upper turning body 3, the boom 4, the arm 5, and the bucket 6), in other words, to operate the hydraulic actuator driving various operating elements.

The operating device 26 is, for example, a hydraulic pilot type device. In this case, the operating device 26 generates a predetermined pilot pressure (i.e., a pilot pressure corresponding to an operation content) by receiving hydraulic oil from the pilot pump. The operating device 26 then applies the pilot pressure to a pilot port of a corresponding control valve among control valves that drive and control the hydraulic actuator. This can reflect the operation content (e.g., an operation direction and an operation amount) at the operating device 26 in the operation of the control valve, and operations of various operating (i.e., elements the driven elements) in accordance with the operation content of the operating device 26 are achieved by the hydraulic actuator.

The operating device 26 may be, for example, an electric type device that outputs an electrical signal (hereinafter, an "operation signal") corresponding to the operation content. In this case, the electrical signal output from the operating device 26 may, for example, be obtained by the controller 30 and the controller 30 may output a control command corresponding to the operation signal, that is, a control command corresponding to the operation content of the operating device 26, to a predetermined hydraulic control valve (hereinafter, referred to as an "operation control valve"). The operation control valve may use hydraulic oil supplied from the pilot pump or the main pump to output a pilot pressure corresponding to the control command from the controller 30 and apply the pilot pressure to a pilot port of a corresponding control valve among the control valves. This can reflect the operation content of the operating device 26 in the operation of the control valve, and operations of various operating elements in accordance with the operation content of the operating device 26 are achieved by the hydraulic actuator.

If the shovel 100 is remotely operated, for example, the controller 30 may use the operation control valve described above to achieve the remote operation of the shovel 100. Specifically, the controller 30 may output a control command corresponding to a content of the remote operation specified by the remote operation signal received by the communication device 90 to the operation control valve. The operation control valve may then use hydraulic oil supplied from the pilot pump or the main pump to output a pilot pressure corresponding to the control command from the controller 30 and apply the pilot pressure to a pilot port of a corresponding control valve among the control valves. This can reflect the content of the remote operation in the operation of the control valve, and operations of various operating elements (i.e., the driven elements) in accordance with the content of the remote operation are achieved by the hydraulic actuator.

The controller 30 is, for example, mounted within the cabin 10, and controls drive of the shovel 100. Functions of the controller 30 may be implemented by any hardware component or any combination of hardware components and software component. For example, the controller 30 is mainly configured by a computer including a central processing unit (CPU), a memory device (i.e., a main memory device) such as a random access memory (RAM), a non-volatile auxiliary memory device such as a read only memory (ROM), and an interface device for various inputs and outputs.

The controller 30, for example, obtains output signals of various sensors, such as the orientation detecting device 85, the boom angle sensor S1, the arm angle sensor S2, the bucket angle sensor S3, the body tilt sensor S4, and the turning state sensor S5, to determine various states of the shovel 100 (e.g., the orientation and pose of the upper turning body 3). The controller 30 performs various controls of the shovel 100 in accordance with various determined states.

If a monitoring target object (e.g., a person, truck, another construction machine, a utility pole, lifting load, a pylon, a building, and the like) is detected within a predetermined monitoring area around the shovel 100 (e.g., a work area within a distance of 5 meters from the shovel 100) by the determining device 34, the controller 30 performs control to avoid contact or the like between the shovel 100 and the monitoring target object (hereinafter, referred to as "contact avoidance control"), for example. The controller 30 includes, for example, a notifying unit 302 and an operation control unit 304 as a functional unit related to the contact avoidance control, achieved by the CPU executing one or more programs installed in the auxiliary storage device or the like.

The recording device 32 records an image captured by the image capturing device 70 at a predetermined timing. The recording device 32 may be implemented by any hardware component or any combination of hardware components and software components. For example, the recording device 32 may be mainly configured by a computer substantially the same as the controller 30. The recording device 32 includes, for example, a record control unit 322 as a functional unit achieved by the CPU executing one or more programs installed in the auxiliary storage device or the like. The recording device 32 includes, for example, a storage unit 324 as a storage area defined in an internal memory of the auxiliary storage device or the like.

The determining device 34 performs determination related to an object around the shovel 100 (e.g., determining detection of an object and classifying an object) based on the image captured by the image capturing device 70. The determining device 34 may be implemented by any hardware component or any combination of hardware components and software components. For example, the determining device 34 may be configured in a manner substantially the same as the controller 30 or the like, that is, may be mainly configured by a computer including a computing device for image processing that performs a high-speed operation in parallel in conjunction with processing of the CPU, in addition to the CPU, the memory device, the auxiliary storage device, the interface device, and the like. In the following, a control device 210 of the management device 200 described later may have substantially the same configuration. The computing device image processing may include a graphics processing unit (GPU), a field-programmable gate array (FPGA), an application specific integrated circuit (ASIC), and the like. The determining device 34 includes, for example, a display control unit 342 and a determining unit 344 as functional units achieved by the CPU executing one or more programs installed in the auxiliary storage device or the like. The determining device 34 includes, for example, a storage unit 346 as a storage area defined in an internal memory of the auxiliary storage device.

All or a part of the controller 30, the recording device 32, and the determining device 34 may be integrated in one device.

The display device 40 is provided in such a location as the display device 40 can be easily viewed by an operator or the like being seated in the driver's seat inside the cabin 10, to display various information images. The display device 40 is, for example, a liquid crystal display or an organic electroluminescence (EL) display. The display device 40 displays, for example, an image representing surroundings of the shovel 100 based on the image captured by the image capturing device 70 under the control of the determining device 34 (i.e., the display control unit 342). Specifically, the display device 40 may display the image captured by the image capturing device 70. Additionally, the display device 40 may display a converted image generated by the determining device 34 (the display control unit 342) performing a predetermined converting process (e.g., a viewpoint converting process) or the like on the image captured by the image capturing device 70. The converted image may be, for example, a viewpoint converted image in which an overhead image having a view from directly above the shovel 100 is combined with a horizontal image having a view of a long distance from the shovel 100 in a horizontal direction. Alternatively, the viewpoint converted image may be a combined image in which images respectively captured by a front camera 70F, a rear camera 70B, a left camera 70L, and a right camera 70R, which will be described later, are converted into viewpoint converted images generated from overhead images and horizontal images, and the viewpoint converted images are combined.

The image capturing device 70 (i.e., an example of an environmental information obtaining unit) captures an image of surroundings of the shovel 100 and outputs the captured image (i.e., an example of environmental information). The image capturing device 70 includes the front camera 70F, the rear camera 70B, the left camera 70L, and the right camera 70R. The image captured by the image capturing device 70 (i.e., each of the front camera 70F, the rear camera 70B, the left camera 70L, and the right camera 70R) is obtained by the determining device 34.

The front camera 70F is, for example, attached to the front end of the upper surface of the cabin 10 to capture an image of surroundings in front of the upper turning body 3.

The rear camera 70B is, for example, attached to the rear end of the upper surface of the upper turning body 3 to capture an image of surroundings behind the upper turning body 3. The left camera 70L is, for example, attached to the left end of the upper surface of the upper turning body 3 to capture an image of surroundings on the left side of the upper turning body 3.

The right camera 70R is, for example, attached to the right end of the upper surface of the upper turning body 3 to capture an image of surroundings on the right side of the upper turning body 3.

The orientation detecting device 85 is configured to detect information related to a relative relationship between the orientation of the upper turning body 3 and the orientation of the lower traveling body 1 (hereinafter referred to as "orientation-related information"). For example, the orientation detecting device 85 may be constituted of a combination of a geomagnetic sensor attached to the lower traveling body 1 and a geomagnetic sensor attached to the upper turning body 3. The orientation detecting device 85 may alternatively be constituted of a combination of a global navigation satellite system (GNSS) receiver attached to the lower traveling body 1 and a GNSS receiver attached to the upper turning body 3. In a configuration in which the upper turning body 3 is driven by an electric motor, the orientation detecting device 85 may be constituted of a resolver attached on the electric motor. The orientation detecting device 85 may, for example, be disposed in a center joint provided in relation to the turning mechanism 2 that achieves relative rotation between the lower traveling body 1 and the upper turning body 3. Information detected by the orientation detecting device 85 is obtained by the controller 30.

The communication device 90 is any device that connects to the communication network and performs communication with an external device such as the management device 200. The communication device 90 may be, for example, a mobile communication module corresponding to a predetermined mobile communication standard such as Long Term Evolution (LTE), 4th Generation (4G), and 5th Generation (5G).

The boom angle sensor S1 is attached to the boom 4 and detects the elevation angle $\theta 1$ with respect to the upper turning body 3 of the boom 4 (hereinafter, referred to as the "boom angle"). The boom angle $\theta 1$ is, for example, the angle of rise from a state where the boom 4 is most lowered. In this case, the boom angle $\theta 1$ is maximized when the boom 4 is most raised. The boom angle sensor S1 may include, for example, a rotary encoder, an acceleration sensor, an angular velocity sensor, a 6-axis sensor, an inertial measurement unit (IMU), and the like. The same may apply to the arm angle sensor S2, the bucket angle sensor S3, and the body tilt sensor S4. The boom angle sensor S1 may be a stroke sensor attached to the boom cylinder 7, and the same may apply to the arm angle sensor S2 and the bucket angle sensor S3. A detection signal corresponding to the boom angle $\theta 1$, detected by the boom angle sensor S1, is obtained by the controller 30.

The arm angle sensor S2 is attached to the arm 5 and detects the rotation angle $\theta 2$ of the arm 5 with respect to the boom 4 (hereinafter, referred to as the "arm angle"). The arm angle $\theta 2$ is, for example, an opening angle from a state where the arm 5 is most closed. In this case, the arm angle θ2 is maximized when the arm 5 is most opened. A detection signal corresponding to the arm angle θ2, detected by the arm angle sensor S2, is obtained by the controller 30.

The bucket angle sensor S3 is attached to the bucket 6 and detects the rotation angle θ3 of the bucket 6 with respect to the arm 5 (hereinafter, referred to as the "bucket angle"). The bucket angle θ3 is the opening angle from a state where the bucket 6 is most closed. In this case, the bucket angle θ3 is maximized when the bucket 6 is most opened. A detection signal corresponding to the bucket angle θ3, detected by the bucket angle sensor S3, is obtained by the controller 30.

The body tilt sensor S4 detects a tilt condition of the body (e.g., the upper turning body 3) with respect to a predetermined plane (e.g., a horizontal plane). The body tilt sensor S4, for example, is attached to the upper turning body 3 and detects the tilt angle of the shovel 100 (i.e., the upper turning body 3) around two axes in the front and rear direction and the left and right direction (hereinafter, referred to as "front and rear tilt angle" and "left and right tilt angle"). A detection signal corresponding to the tilt angle (i.e., the front and rear tilt angle and the left and right tilt angle), detected by the body tilt sensor S4, is obtained by the controller 30.

The turning state sensor S5 is attached to the upper turning body 3 and outputs detection information related to a turning state of the upper turning body 3. The turning state sensor S5 detects, for example, the turning angular acceleration, the turning angular velocity, and the turning angle of the upper turning body 3. The turning state sensor S5 may include, for example, a gyro sensor, a resolver, a rotary encoder, and the like.

Here, if the body tilt sensor S4 includes a gyro sensor, a 6-axis sensor, an IMU, or the like that can detect the angular velocity around 3 axes, the turning state of the upper turning body 3 (e.g., the turning angular acceleration) may be detected based on the detection signal of the body tilt sensor S4. In this case, the turning state sensor S5 may be omitted.

If a monitoring target object is detected by the determining device 34 (i.e., the determining unit 344) in a monitoring area around the shovel 100, the notifying unit 302 notifies an operator or the like of the detection. This enables the operator or the like to recognize an entry even when the object is positioned in a blind area when viewed from the cabin 10, and to perform an operation to secure safety such as canceling operation to the operating device 26 when a monitoring target object enters a relatively close area around the shovel 100.

For example, the notifying unit 302 outputs a control signal to a sound output device (e.g., a speaker, a buzzer, or the like) mounted inside the cabin 10 to notify the operator or the like that a monitoring target object has been detected in a monitoring area in proximity to the shovel 100.

Additionally, for example, through the display device 40, a notification indicating that a monitoring target object has been detected within a monitoring area around the shovel 100 by the determining device 34 may be provided, as will be described later.

For example, if the shovel 100 is remotely operated, the notifying unit 302 may transmit a signal indicating that a monitoring object target is detected in a monitoring area around the shovel 100 (hereinafter referred to as a "notification signal") to the management device 200. This enables the management device 200 to control the display device (e.g., the display device 230) or the sound output device provided in the management device 200 in response to a notification signal received from the shovel 100 and notify a remote operation operator of the detection.

The operation control unit 304 (i.e., an example of a control unit) restricts the operation of the shovel 100 if a monitoring target object is detected within a monitoring area around the shovel 100 by the determining device 34 (i.e., the determining unit 344). This can, when a monitoring target object enters a monitoring area in proximity to the shovel 100, restrict the operation of the shovel 100 and reduce the possibility of contact between the shovel 100 and the monitoring target object. At this time, restrictions on the operation of the shovel 100 may include delaying the operations of various operating elements (i.e., the driven elements) of the shovel 100 that are outputs with respect to an operation content (i.e., an operation amount) of an operator or the like in the operating device 26. Additionally, restrictions on the operation of the shovel 100 may include stopping the operation of the operating elements (i.e., the driven elements) of the shovel 100 regardless of the operation content of the operating device 26. The operating elements (i.e., the driven elements) of the shovel 100 to which restrictions on the operation of the shovel 100 are applied may be all of the operating elements that can be operated by the operating device 26, or may be some of the operating elements necessary to avoid contact between the shovel 100 and the monitoring target object.

The operation control unit 304 may, for example, output a control signal to a pressure reduction valve provided on a secondary pilot line of the operating device 26 of a hydraulic pilot type to depressurize a pilot pressure corresponding to the operation content performed by an operator or the like on the operating device 26. The operation control unit 304 may output a control signal, limiting an operation amount smaller than the operation content (i.e., the operation amount) corresponding to the operation signal input from the operating device 26 of an electric type, to the solenoid valve (i.e., an operation control valve) to control the solenoid valve and to reduce the pilot pressure acting on the control valve from the solenoid valve. Alternatively, the operation control unit 304 may output a control signal, limiting an operation amount smaller than the content (i.e., the operation amount) of the remote operation, specified by the remote operation signal, to the operation control valve, to reduce the pilot pressure acting on the control valve from the operation control valve. This can reduce the pilot pressure, corresponding to the content of the operation performed on the operating device 26 or the remote operation, acting on the control valve that controls the hydraulic oil supplied to the hydraulic actuator and restrict the operations of various operating elements (i.e., the driven elements).

The record control unit 322 (i.e., an example of the recording unit) records images captured by the image capturing device 70 (i.e., the front camera 70F, the rear camera 70B, the left camera 70L, and the right camera 70R) in the storage unit 324 at a predetermined timing (hereinafter referred to as a "recording timing"). Thus although the capacity of the storage unit 324 is limited, the images captured by the image capturing device 70 can be recorded to the storage unit 324 at a predetermined necessary timing. As described later, the transmission capacity is reduced when the captured image stored in the storage unit 324 is transmitted to the management device 200, thereby reducing the communication cost. Specifically, for example, when a recording timing is reached, the record control unit 322 obtains a captured image corresponding to the recording timing among captured images including past images in a ring buffer defined in the RAM or the like and records the image in the storage unit 324.

The recording timing may be, for example, a predetermined periodic timing. The recording timing may be a time of occurrence of a state of the shovel 100, in which incorrect determination likely occurs when an object around the shovel 100 is determined by the determining device 34 (i.e., the determining unit 344) based on the image captured by the image capturing device 70. Specifically, the recording timing may be when the shovel 100 travels and when the shovel 100 turns. Additionally, the recording timing may be when the determining unit 344 determines that an object is detected in a monitoring area around the shovel 100. The recording timing may be started by the controller ON, by a gate lock lever release, or by an operation lever ON. The same applies to a case of the shovel assist system SYS (i.e., the shovel 100) of FIG. 7 and FIG. 8, which will be described later.

In FIG. 3, a result determined by the determining unit 344 is input to the recording device 32 (i.e., the record control unit 322). However, if the recording timing is defined regardless of the result determined by the determining unit 344, the result determined by the determining unit 344 is not required to be input to the recording device 32. The same applies to FIG. 8, which will be described later.

As described above, a captured image IM1 is recorded in the storage unit 324 under the control of the record control unit 322 from when an initial process performed after starting the shovel 100 is completed to when the shovel 100 stops. One or more captured images IM1 recorded in the storage unit 324 are transmitted to the management device 200 through the communication device 90 (i.e., an example of an environmental information transmission unit) at a predetermined timing (hereinafter, referred to as an "image transmission timing").

The image transmission timing may be, for example, when an operation of stopping the shovel 100 (e.g., a key switch OFF operation) is performed. The transmission timing may be when the free capacity of the storage unit 324 is below a predetermined threshold value. This is because the total capacity of the captured images IM1 recorded in the storage unit 324 may be relatively large during the period from the start to the stop of the shovel 100. Additionally, the image transmission timing may be, for example, when the initial process performed after starting the shovel 100 is completed. In this case, the storage unit 324 is a storage area defined in a non-volatile internal memory, and a configuration, in which the captured images IM1 recorded during the period from the previous start and stop of the shovel 100 are transmitted to the management device 200, may be used. The same applies to the shovel assist system SYS (i.e., the shovel 100) of FIG. 7 and FIG. 8, which will be described later.

A configuration in which the captured images IM1 are sequentially transmitted to the management device 200 through the communication device 90 every time the captured image is recorded in the storage unit 324 may be used.

As described above, the display control unit 342 displays an image representing the surroundings of the shovel 100 (hereinafter, referred to as a "shovel surroundings image") on the display device 40.

The display control unit 342 displays, for example, an image captured by the image capturing device 70 as the shovel surroundings image on the display device 40. Specifically, the display control unit 342 may display images captured by some of cameras selected from the front camera 70F, the rear camera 70B, the left camera 70L, and the right camera 70R, on the display device 40. At this time, a configuration, in which the display control unit 342 switches a camera corresponding to a captured image to be displayed on the display device 40 in response to a predetermined operation performed by an operator or the like, may be used. Alternatively, the display control unit 342 may display all images captured by the front camera 70F, the rear camera 70B, the left camera 70L, and the right camera 70R, on the display device 40.

For example, the display control unit 342 generates a converted image in which a predetermined converting process is performed on the image captured by the image capturing device 70 as the shovel surroundings image and displays the generated converted image on the display device 40. The converted image may be, for example, a viewpoint converted image in which an overhead image having a view from directly above the shovel 100 is combined with a horizontal image having a view of a long distance from the shovel 100 in a horizontal direction. Alternatively, the viewpoint converted image may be a combined image (hereinafter, a "viewpoint converted combined image") in which images respectively captured by the front camera 70F, the rear camera 70B, the left camera 70L, and the right camera 70R are converted into viewpoint converted images generated from overhead images and horizontal images, and the viewpoint converted images are combined in a predetermined manner.

If a monitoring target object is detected in a predetermined monitoring area around the shovel 100 by the determining unit 344, the display control unit 342 superimposes an image that highlights an area corresponding to the detected object on the shovel surroundings image (hereinafter, referred to as a "detected object area") to display the shovel surroundings image. This enables an operator or the like to easily check the detected object on the shovel surroundings image. A specific display configuration will be described later (see FIG. 5).

Here, if the shovel 100 is operated remotely, a function substantially the same as the function of the display control unit 342 may be provided in the management device 200. This enables an operator of the remote operation to check the shovel surroundings image and check the detected object on the shovel surroundings image through a display device provided in the management device 200 (e.g., the display device 230).

The determining unit 344 performs determination related to an object around the shovel 100 based on the image captured by the image capturing device 70 by using a learned model LM on which machine learning is performed, stored in the storage unit 346. Specifically, the determining unit 344 loads the learned model LM from the storage unit 346 into the main storage device such as the RAM (i.e., a path 344A) and causes the CPU to perform the determination related to an object around the shovel 100 based on the image captured by the image capturing device 70.

For example, as described above, the determining unit 344 detects a monitoring target object while determining whether there is the monitoring target object within a monitoring area around the shovel 100.

For example, the determining unit 344 determines (identifies) a type of the detected monitoring target object, that is, classifies the detected monitoring target object in a predetermined list of classifications of the monitoring target object (hereinafter, referred to as a "monitoring target list"). The monitoring target list may include a person, a truck, another construction machine, a utility pole, lifting load, a pylon, a building, and the like, as described above.

For example, the determining unit 344 determines a state of the monitoring target object that is detected in the monitoring area around the shovel 100. Specifically, if the detected monitoring target object is a person, the determining unit 344 may determine which of classifications (hereinafter, referred to as "state classifications") related to predetermined states, such as "sitting", "standing", "lying", and the like, a state of the detected person corresponds to. If the detected monitoring target object is a truck, the determining unit 344 may determine an open/close state of the right and left side gates of the bed of the detected truck. More specifically, the determining unit 344 may determine which of state classifications of "closing the left and right side gates", "opening only the left side gate", "opening only the right side gate", and "opening the left and right side gates", a state of the truck corresponds to.

Additionally, for example, the determining unit 344 determines a state of each part of the monitoring target object that is detected in the monitoring area around the shovel 100. Specifically, when the detected monitoring target object is a person, the determining unit 344 may determine a state of each part of the person (e.g., right and left arms, palms of the left and right hands, fingers of the left and right hands, and the like). This enables the determining device 34 to determine, for example, a motion of a person such as a gesture.

For example, as illustrated in FIG. 4A and FIG. 4B, the learned model LM is mainly configured by a neural network 401.

In this example, the neural network 401 is what is called a deep neural network including more than one interlayer (i.e., one hidden layer) between input and output layers. The neural network 401 defines a weight parameter representing the strength of the connection to a lower layer for each of multiple neurons constituting each of the interlayers. The neural network 401 is configured such that each neuron of each layer is configured to output a sum of values, which are values input from multiple neurons of an upper layer multiplied by weight parameters defined for the respective neurons of the upper layer, to a neuron of the lower layer through a threshold function.

On the neural network 401, machine learning, that is, specifically deep learning is performed by the management device 200 (i.e., a learning unit 2103), as described below, to optimize weight parameters described above. This enables, for example, as illustrated in FIG. 4A, the neural network 401 to receive an input of an image captured by the image capturing device 70 as an input signal x and output a probability (i.e., predictive probability) that an object is present for each type of objects corresponding to the predetermined monitoring target list (in this example, a "person", "a truck", . . . ) as an output signal y. The neural network 401 is, for example, a convolutional neural network (CNN). The CNN is a neural network to which existing image processing technologies (e.g., a convolution process and a pooling process) have been applied. Specifically, the CNN repeats a combination of the convolution process and the pooling process performed on the image captured by the image capturing device 70 to retrieve feature data (i.e., a feature map) having a smaller size than the captured image. Then, a pixel value of each pixel of the retrieved feature map is input to a neural network including multiple fully connected layers, and the output layer of the neural network can output, for example, predictive probability that an object is present for each type of the objects. Here, the management device 200 is an example of a machine learning device.

Alternatively, the neural network 401 may be configured to receive an input of an image captured by the image capturing device 70 as the input signal x, and output the position and size of the object in the captured image (that is, an area occupied by the object on the captured image) and the type of the object as the output signal y. That is, the neural network 401 may be configured to detect an object on the captured image (i.e., determine an area occupied by the object on the captured image) and to determine the classification of the object. In this case, the output signal y may be configured in an image data format in which information related to the area occupied by the object and the classification of the object is added to the captured image that is input as the input signal x in a superimposed manner. This enables the determining unit 344 to determine a relative position (i.e., a distance and a direction) of the object from the shovel 100 based on the position and size of the area occupied by the object on the image captured by the image capturing device 70, output from the learned model LM (i.e., the neural network 401). This is because the image capturing device 70 (i.e., the front camera 70F, the rear camera 70B, the left camera 70L, and the right camera 70R) is fixed to the upper turning body 3 and an imaging range (i.e., an image angle) is predetermined (or fixed). Then, if the position of the object detected by the learned model LM is within the monitoring area and is classified into the object of the monitoring target list, the determining unit 344 can determine that the monitoring target object is detected in the monitoring area.

For example, the neural network 401 may be configured to include a neural network corresponding to each of a process of extracting an occupied area (i.e., a window) where the object in the captured image is present and a process of identifying a type of the object in the extracted area. That is, the neural network 401 may be configured to perform the detection of the object and the classification of the object in stages. Alternatively, for example, the neural network 401 may be configured to include a neural network corresponding to each of a process of defining a classification of the object and an occupied area of the object (i.e., a bounding box) for each grid cell obtained by dividing the entire area of the captured image into a predetermined number of partial areas, and a process of combining the occupied area of the object for each type based on the classification of the object for each grid cell, and determining a final occupied area of the object. That is, the neural network 401 may be configured to perform the detection of the object and the classification of the object in parallel.

The determining unit 344, for example, calculates a predictive probability for each type of the object on the captured image at a predetermined control period. When calculating the predictive probability, the determining unit 344 may further increase the predictive probability if a present determined result matches a previous determined result. For example, with respect to a predictive probability that, at the previous determination, it is determined that an object imaged in a predetermined area on the captured image is a "person", if it is determined that the object is a "person" continuously at the current time, the predictive probability that it is determined that the object is a "person" at the current time may be further increased. This calculates a predictive probability that is relatively high, for example, if a determined result related to the classification of the object with respect to the same image area is continuously matched. Therefore, the determining unit 344 can suppress incorrect determination.

Additionally, the determining unit 344 may perform determination related to the object on the captured image considering movements of the shovel 100, such as traveling and turning. This is because, even when the object around the shovel 100 is stationary, there is a possibility that a position of the object on the captured image moves by the shovel 100 traveling or turning, and the object cannot be determined as the same object. For example, an image area determined to be a "person" (y1) in the present process and an image area determined to be a "person" in the previous process may be different by the shovel 100 traveling or turning: In this case, if the image area determined to be the "person" (y1) in the present process is within a predetermined range from the image area determined to be the "person" (y1) in the previous process, the determining unit 344 may regard the image areas as the same object and perform continuous matching determination (that is, determination of a state in which the same object is continuously detected). If the determining unit 344 performs the continuous matching determination, the determining unit 344 may include, in addition to the image area used in the previous determination, an image area within a predetermined range from the image area, as the image area to be used in the present determination process. This enables the determining unit 344 to, even if the shovel 100 travels or turns, perform a continuous matching determination with respect to the same object around the shovel 100.

As illustrated in FIG. 4B, the neural network 401 may be configured to receive an input of an image captured by the image capturing device 70 as the input signal x, and output a state of each part of a person detected on the imaging image as the output signal y. In this example, the neural network 401, sequentially in time, outputs output signals y1 (*t*) to y4 (*t*) corresponding to a state of the right arm, a state of the left arm, a state of the right palm, and a state of the left palm. The output signals y1 (*t*) to y4 (*t*) represent output signals y1 to y4 at time t. Thus, the determining device 34 can determine a gesture motion of a worker imaged on the image captured by the image capturing device 70 based on changes in the output signals y1 to y4 obtained from multiple images captured between time t1 and time tn, i.e., changes in the state of the right arm, the state of the left arm, the state of the right palm, and the state of the left palm. As described, based on sequential changes of each part of the object in time, the probability of each motion content of the object input into the classification table, is calculated. Then, a motion content having the highest probability is determined as the motion content of the object being detected. Specifically, in this example, the determining device 34 may determine a worker's gesture requesting sudden stop.

For example, at time t1, the neural network 401 outputs output signals y1 (t1) to y4 (t1) corresponding to a raised right arm, an opened right palm, a raised left arm, and an opened left palm. Subsequently, at time t2, the neural network 401 outputs output signals y1 (t2) to y4 (t2) corresponding to a lowered right arm, an opened right palm, a lowered left arm, and an opened left palm. Then, the states of the output signals y1 to y4 at time t1 and at time t2 are repeated until time tn, so that the determining device 34 may determine a worker's gesture requesting sudden stop imaged in the image captured by the image capturing device 70 based on the output signals y1 to y4 of the neural network 401 between time t1 and time tn (i.e., results determined by the determining unit 344). At this time, the probability is calculated for each motion content (i.e., gesture content) of a worker, such as "attachment raising", "attachment lowering", "horizontal move (turn)", "horizontal move (travel)", "crawler spin turn", "stop", "sudden stop", and "release". The "sudden stop", for which the highest probability is calculated, is determined as the gesture requested by the worker. This enables the determining device 34 to output a signal requesting sudden stop to the controller 30, and the controller 30 (i.e., the operation control unit 304) stops an operation of the actuator driving driven elements in response to the signal. As described, the controller 30 can control the actuator based on the motion content of the object around the shovel 100.

The result determined by the determining unit 344 is, for example, displayed on the display device 40 through the display control unit 342.

For example, as illustrated in FIG. 5, a main screen 41V is displayed on the display device 40, and an image captured by the image capturing device 70 is displayed in a camera image display area 41*m* in the main screen 41V. This captured image is a captured image corresponding to the input signal x of FIG. 4A. The main screen 41V includes, in addition to the camera image display area 41*m*, a date and time display area 41*a*, a traveling mode display area 41*b*, an attachment display area 41*c*, an average fuel consumption display area 41*d*, an engine control state display area 41*e*, an engine operation time display area 41*f*, a cooling water temperature display area 41*g*, a fuel remaining amount display area 41*h*, a rotational speed mode display area 41*i*, a urea water remaining amount display area 41*j*, and a hydraulic oil temperature display area 41*k*.

The date and time display area 41*a* is an area displaying the current date and time in the main screen 41V.

The traveling mode display area 41*b* is an area displaying a shape representing the current traveling mode of the shovel 100 in the main screen 41V.

The attachment display area 41*c* is an area displaying a graphic schematically representing the type of attachment currently mounted on the shovel 100 in the main screen 41V.

The average fuel consumption display area 41*d* is an area displaying the current average fuel consumption of the shovel 100 in the main screen 41V. The average fuel consumption is, for example, fuel consumption during a predetermined time period.

The engine control state display area 41*e* is an area displaying a graphic schematically representing a control state of the engine 11 in the main screen 41V.

The engine operation time display area 41*f* is an area displaying the total operation time of the engine 11 from a predetermined timing in the main screen 41V.

The cooling water temperature display area 41*g* is an area displaying a current temperature condition of cooling water of the engine 11 in the main screen 41V.

The fuel remaining amount display area 41*h* is an area, displaying an amount state of remaining fuel stored in a fuel tank of the shovel 100, in the main screen 41V.

The rotational speed mode display area 41*i* is an area displaying a mode related to rotation speed set for the current engine 11 (i.e., a rotational speed mode).

The urea water remaining amount display area 41*j* is an area, displaying a remaining amount status of urea water stored in a urea water tank, in the main screen 41V.

In this example, an image captured by the rear camera 70B of the image capturing device 70 is displayed in the camera image display area 41*m*, and the captured image images a worker PS working behind the shovel 100 and a truck TK parked behind the shovel 100.

As described above, by inputting the image data of the image captured by the rear camera 70B into the learned model LM (i.e., the neural network 401), the determining unit 344 can obtain areas occupied by objects in the captured image and types of the objects occupying the areas that are output from the learned model LM. Thus, in the present example, a box icon 501 having a shape enclosing an area, occupied by the object classified as a "person" (i.e., the worker PS), that is output from the learned model LM, and a character information icon 502 representing that the detected (classified) object is a person are superimposed on the captured image to be displayed. Additionally, a box icon 503 having a shape enclosing an area, occupied by the object classified as a "truck" (i.e., the truck TK), that is output from the learned model LM and a character information icon 504 representing that the detected (classified) object is a truck are superimposed on the captured image to be displayed. This enables an operator or the like to easily recognize the detected objects and easily recognize the types of the detected objects. Additionally, the camera image display area 41m of the display device 40 may display the above-described prediction probability, specifically, the prediction probability that "a person" is present and the prediction probability that "a truck" is present, which are used for the determination performed by the determining unit 344. If it is determined that a person is present within a predetermined range around the shovel 100 before an operator operates the operating device 26, the controller 30 (i.e., the operation control unit 304) may limit the actuator to be inoperative or to operate at a slow speed even if the operator operates the operation lever. Specifically, in a case where the operating device 26 is a hydraulic pilot type, if it is determined that a person is present within a predetermined range around the shovel 100, the controller 30 can cause the actuator to be inoperative by locking a gate lock valve. In a case where the operating device 26 is an electric type, disabling a signal from the controller 30 to the control valve can cause the actuator to be inoperative. The same applies in a case where the operating device 26 of another type is used, if an operation control valve that outputs pilot pressure in response to a control command from the controller 30 and that applies the pilot pressure to a pilot port of the corresponding control valve among the control valves is used. If the actuator is demanded to be caused to operate at a slow speed, by limiting a control signal from the controller 30 to the operation control valve, to a content corresponding to a relatively small pilot pressure, the actuator can be caused to operate at a slow speed. As described, if it is determined that the detected object is within a predetermined range around the shovel 100, the actuator is not driven or is driven at a speed lower than an operation speed corresponding to the operation input to the operating device 26 (i.e., a slow speed), even if the operating device 26 is operated. Further, while the operator is operating the operating device 26, if it is determined that a person is present within a predetermined range around the shovel 100, the operation of the actuator may be stopped or decelerated regardless of the operator's operation. Specifically, in a case where the operating device 26 is a hydraulic pilot type, if it is determined that a person is present within a predetermined range around the shovel 100, the controller 30 stops the actuator by locking the gate lock valve. If the operation control valve, that outputs a pilot pressure corresponding to the control command from the controller 30 and that applies the pilot pressure to a pilot port of a corresponding control valve among the control valves, is used, the controller 30 may cause the actuator to be inoperative or decelerate its operation by disabling a signal to the operation control valve or outputting a deceleration command to the operation control valve. If the detected object is a truck, the control related to the stop or deceleration of the actuator is not required to be performed. For example, the actuator may be controlled to avoid the detected truck. As described, the type of the detected object is determined and the actuator is controlled based on the determination.

The image captured by the image capturing device 70 may be displayed on the entire display area of the display device 40. Additionally, the display device 40 may display the above-described converted image based on the image captured by the image capturing device 70 (e.g., the above-described viewpoint converted combined image), and, in this case, the box icon and the character information icon may be superimposed on a portion corresponding to an area occupied by an object on the converted image to be displayed. If the shovel 100 is remotely operated, the substantially same contents as in FIG. 5 may be displayed on the display device of the management device 200 (e.g., the display device 230).

In the storage unit 346, the learned model LM is stored. If the communication device 90 receives an updated learned model from the management device 200, that is, a learned model on which additional learning has been performed (hereinafter referred to as an "additionally learned model") as described later, the learned model LM stored in the storage unit 346 is updated to the received additionally learned model. This allows the determining unit 344 to utilize the additionally learned model on which additional learning has been performed in the management device 200, thereby improving the determination accuracy with respect to an object around the shovel 100 in accordance with the update of the learned model.

<Configuration of the Management Device>

The management device 200 includes the control device 210, a communication device 220, the display device 230, and an input device 240.

The control device 210 controls various operations of the management device 200. The control device 210 includes a determining unit 2101, a teaching data generating unit 2102, and a learning unit 2103 as functional units implemented by the CPU executing, for example, one or more programs stored in ROM or the non-volatile auxiliary storage device. The control device 210 includes storage units 2104 and 2105 as storage areas defined in the non-volatile internal memory or the like such as the auxiliary memory device.

The communication device 220 is a given device that connects to the communication network and communicates with the external devices such as the multiple shovels 100.

The display device 230 is, for example, a liquid crystal display or an organic EL display, and displays various information images under the control of the control device 210.

The input device 240 receives an operation input from a user. The input device 240 includes, for example, a touch panel mounted on the liquid crystal display or the organic EL display. Additionally, the input device 240 may include a touch pad, a keyboard, a mouse, a trackball, or the like. Information related to an operational state of the input device 240 is obtained by the control device 210.

The determining unit 2101 performs determination related to an object around the shovel 100 based on the captured images IM1 received from the multiple shovels 100, that is, the captured images IM1 read from the storage unit 2104 (i.e., the path 2101A) by using the learned model LM, on which machine learning has been performed by the learning unit 2103, stored in the storage unit 2105. Specifically, the determining unit 2101 performs determination related to an object around the shovel 100 based on the captured images IM1 read from the storage unit 2104 by loading the learned model LM from the storage unit 346 into the main storage device such as the RAM (i.e., the path 2101B) and by causing the CPU to execute the determination. More specifically, the determining unit 2101 sequentially inputs multiple captured images IM1 stored in the storage unit 2104 into the learned model LM to perform determination related to an object around the shovel 100. A result 2101D determined by the determining unit 2101 is input to the teaching data generating unit 2102. At this time, the determined result 2101D may be input to the teaching data generating unit 2102 sequentially for each captured image IM1, or may be input to the teaching data generating unit 2102 after being compiled into a list or the like, for example.

The teaching data generating unit 2102 (i.e., an example of the teaching information generating unit) generates teaching data (i.e., an example of teaching information) for the learning unit 2103 to perform machine learning on a learning model based on the multiple captured images IM1 received from the multiple shovels 100. The teaching data represents a combination of a given captured image IM1 and a correct answer to be output by the learning model in response to receiving the captured image IM1 as an input of the learning model. The learning model is an object for machine learning and is naturally configured as in the learned model LM, e.g., is mainly configured by the neural network 401 described above.

For example, the teaching data generating unit 2102 reads the captured images IM1 received from the multiple shovels 100 from the storage unit 2104 (i.e., the path 2102A) to display the captured image IM1 on the display device 40 and display a graphical user interface (GUI) for an administrator of the management device 200, an operator of the management device 200, or the like, to create the teaching data (hereinafter, referred to as a "teaching data creation GUI"). An administrator, an operator, or the like uses the input device 240 to operate the teaching data creation GUI and instruct a correct answer corresponding to each captured image IM1 to create the teaching data in a format according to an algorithm of the learning model. In other words, the teaching data generating unit 2102 can generate multiple teaching data (i.e., a teaching data set) in accordance with an operation (i.e., a work) for the multiple captured images IM1, performed by an administrator, an operator, or the like.

The teaching data generating unit 2102 generates the teaching data used by the learning unit 2103 to perform additional learning on the learned model LM based on the multiple captured images IM1 received from the multiple shovels 100.

For example, the teaching data generating unit 2102 reads the multiple captured images IM1 from the storage unit 2104 (i.e., the path 2102A) and displays the captured images IM1 and the results (output results) 2101D determined by the determining unit 2101 corresponding to the captured images IM1 side by side, respectively, on the display device 230. This allows an administrator or an operator of the management device 200 to select a combination corresponding to incorrect determination from the combinations of the captured images IM1 and the corresponding determined results displayed on the display device 230 through the input device 240. An administrator, an operator, or the like can create the additional learning teaching data representing a combination of the captured image IM1 that is an image of a combination corresponding to the incorrect determination, that is, the captured image IM1 that causes the learned model LM to perform the incorrect determination, and the correct answer to be output by the learned model LM in response to receiving the captured image IM1 as an input, by using the input device 240 to operate the teaching data creation GUI. In other words, the teaching data generating unit 2102 can generate multiple additional learning teaching data (i.e., the additional learning teaching data set) in accordance with an operation (a work) performed by an administrator, an operator, or the like on the captured image IM1 corresponding to the incorrect determination in the learned model LM, selected from the multiple captured images IM1.

That is, the teaching data generating unit 2102 generates the teaching data for generating the first learned model LM from the multiple captured images IM1 received from the multiple shovels 100. Then, the teaching data generating unit 2102 generates, at a predetermined timing (hereinafter, referred to as an "additional learning timing"), the additional learning teaching data from the captured image IM1 for which incorrect determination is performed in the learned model LM, selected from the captured images IM1 received from the multiple shovels 100 after the recent learned model LM is installed in the multiple shovels 100.

Here, some of the captured images IM1 received from the multiple shovels 100 may be used as a base of a validation data set for the learned model LM. That is, the captured images IM1 received from the multiple shovels 100 may be sorted into the captured image IM1 for generating the teaching data and the captured image IM1 for generating a validation data set.

The additional learning timing may be a periodically specified timing, e.g., when one month has passed after the previous machine learning (or additional learning) is performed. The additional learning timing may be, for example, when the number of the captured images IM1 exceeds a predetermined threshold value, that is, a timing when a certain number of captured images IM1, required for the additional learning performed by the learning unit 2103, are obtained.

The learning unit 2103 performs machine learning on the learning model to generate the learned model LM based on teaching data 2102B (i.e., a teaching data set) generated by the teaching data generating unit 2102. The generated learned model LM is stored in the storage unit 2105 (i.e., the path 2103B) after the accuracy validation is performed using a previously prepared validation data set.

The learning unit 2103 generates the additionally learned model by performing additional learning on the learned model LM read from the storage unit 2105 (i.e., the path 2103A) based on the teaching data (i.e., the teaching data set) generated by the teaching data generating unit 2102. After accuracy validation is performed on the additionally learned model by using the previously prepared validation data set, the learned model LM stored in the storage unit 2105 is updated (i.e., the path 2103B) with the additionally learned model on which the accuracy validation has been performed using the previously prepared validation data set.

For example, as described above, if the learning model is mainly configured by the neural network 401, the learning unit 2103 optimizes weight parameters by applying a known algorithm such as backpropagation to generate the learned model LM so that the error between the output of the learning model and the teaching data is reduced. The same applies to the generation of the additionally learned models.

Here, the first learned model LM generated from the learning model may be generated by an external device different from the management device 200. In this case, the teaching data generating unit 2102 may be configured to generate only the additional learning teaching data and the learning unit 2103 may be configured to generate only the additionally learned model.

The captured images IM1 received from the multiple shovels 100 are stored (saved) in the storage unit 2104 through the communication device 220.

Here, the captured images IM1 that have been used to generate the teaching data by the teaching data generating unit 2102 may be stored in a storage device other than the storage unit 2104.

The learned model LM is stored (saved) in the storage unit 2105. The learned model LM updated with the additionally learned model generated by the learning unit 2103 is transmitted to each of the multiple shovels 100 through the communication device 220 (i.e., an example of a model transmission unit) at a predetermined timing (hereinafter, referred to as a "model transmission timing"). This enables the identical updated learned model LM, that is, the additionally learned model, to be shared among the multiple shovels 100.

The model transmission timing may be when the learned model LM stored in the storage unit 2105 is updated, that is, a timing immediately after the learned model LM stored in the storage unit 2105 is updated or a timing when a predetermined time elapses after the update. Additionally, the model transmission timing may be, for example, when a confirmation response is received the by communication device 220 in response to a notification of the update of the learned model LM transmitted to the multiple shovels 100 through the communication device 220 after the learned model LM has been updated.

[Specific Operation of the Shovel Assist System]

Next, with reference to FIG. 6, a specific operation of the shovel assist system SYS will be described.

Figure 6:
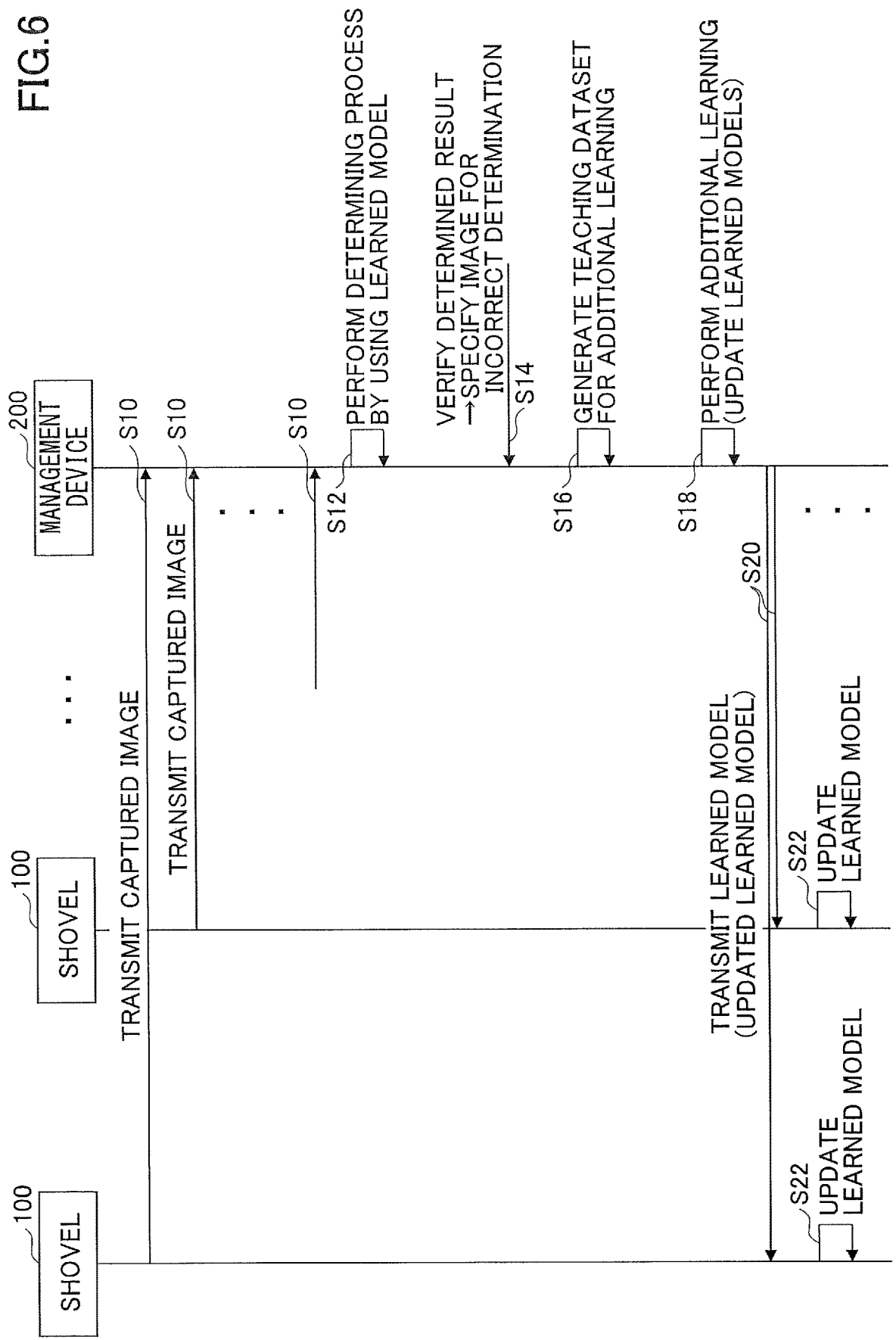
FIG. 6 is a sequence diagram illustrating an example of an operation of the shovel assist system.

FIG. 6 is a sequence diagram illustrating an example of the operation of the shovel assist system SYS.

In step S10, the communication devices 90 of the multiple shovels 100 transmit the captured image IM1 to the management device 200 at each image transmission timing. This allows the management device 200 to receive the captured image IM1 from each of the shovels 100 through the communication device 220 and store the captured image IM1 in the storage unit 2104.

In step S12, the determining unit 2101 of the management device 200 inputs the multiple captured images IM1 that are received from the multiple shovels and that are stored in the storage unit 2104 into the learned model LM to perform a determining process.

In step S14, an administrator of the management device 200, an operator of the management device 200, or the like verifies a result determined by using the learned model LM and specifies (selects) the captured image IM1 for which incorrect determination is performed in the learned model LM from among the multiple captured images IM1 through the input device 240.

In step S16, the teaching data generating unit 2102 of the management device 200 generates the additional learning teaching data set in accordance with an operation of the teaching data creation GUI performed by an administrator, an operator, or the like through the input device 240.

In step S18, the learning unit 2103 of the management device 200 performs additional learning on the learned model LM by using the additional learning teaching data set to generate the additionally learned model, and updates the learned model LM stored in the storage unit 2104 with the additionally learned model.

In step S20, the communication device 220 of the management device 200 transmits the updated learned model LM to each of the multiple shovels 100.

Here, the timing at which the updated learned model LM is transmitted to the shovel 100 (i.e., the model transmission timing) may differ for each of the multiple shovels 100 as described above.

In step S22, each of the multiple shovels 100 updates the learned model LM stored in the storage unit 346 with the updated learned model received from the management device 200.

[Another Example of the Configuration of the Shovel Assist System]

Next, with reference to FIG. 7, another example of the configuration of the shovel assist system SYS according to the present embodiment will be described.

Figure 7:
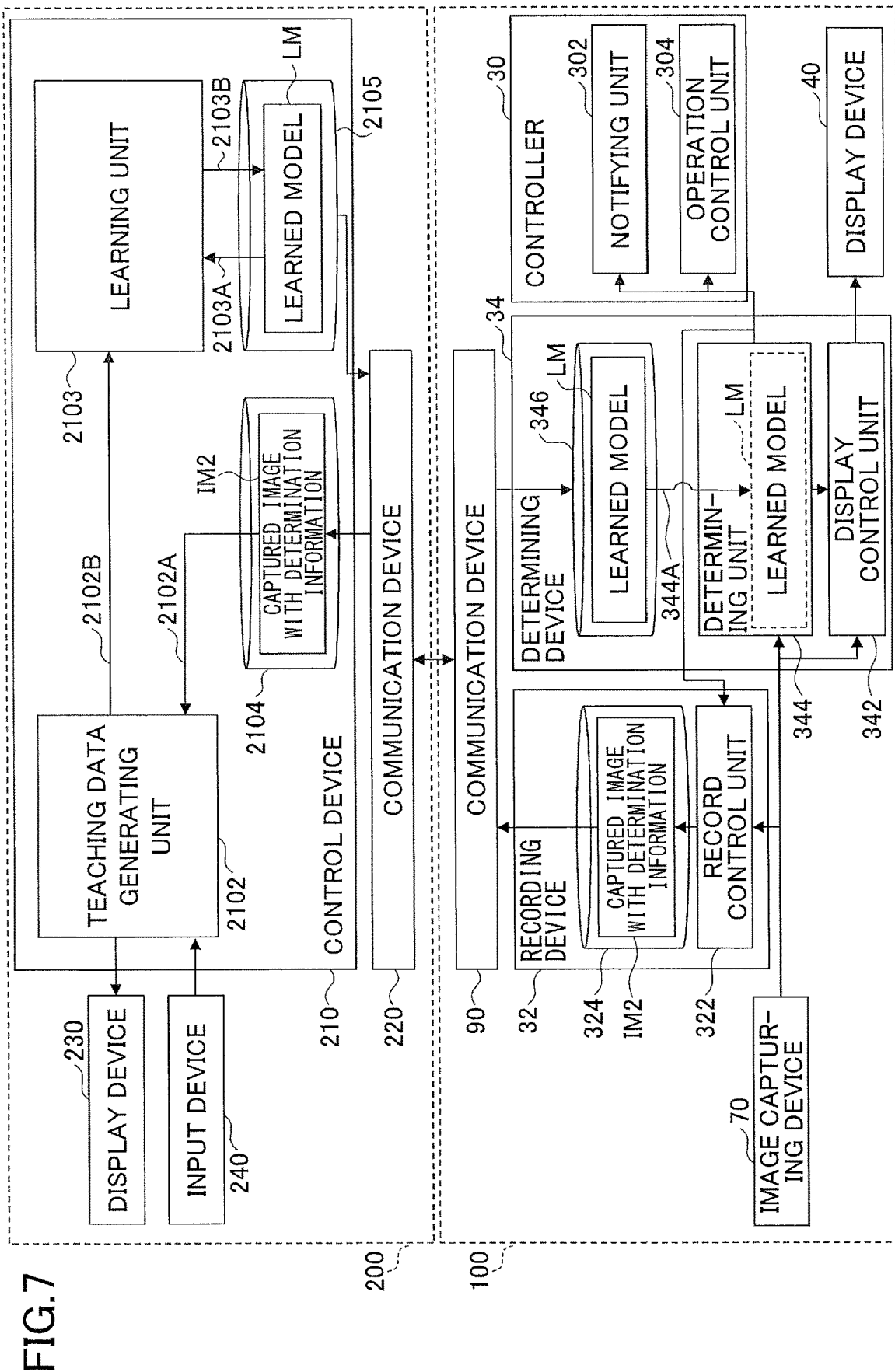
FIG. 7 is a functional block diagram illustrating another example of the functional configuration of the shovel assist system.

FIG. 7 is a functional block diagram illustrating another example of the functional configuration of the shovel assist system SYS according to the present embodiment. In the following, in the present example, a part different from the above-described example (FIG. 3) will be mainly described.

<Structure of the Shovel>

As a configuration related to the control system, the shovel 100 includes the recording device 32, the determining device 34, and the like, as in the above-described example, and the recording device 32 includes the record control unit 322, and the storage unit 324, as in the above-described example.

As in the above-described example, the record control unit 322 records the images captured by the image capturing device 70 (i.e., the front camera 70F, the rear camera 70B, the left camera 70L, and the right camera 70R) at a predetermined recording timing to the storage unit 324. At this time, the record control unit 322 also records a result determined by the determining unit 344, that is, a result determined by using the learned model LM, based on the captured image of a recording target. In the present example, the record control unit 322 records a captured image IM2 including information related to the determined result (i.e., determination information) as tag information or the like (hereinafter, referred to as a captured image with the determination information) to the storage unit 324.

Here, the captured image and the determination information may be recorded as separate files. In this case, in the storage unit 324, the captured image may be associated with the determination information.

The captured image with the determination information IM2 is recorded in the storage unit 324 under the control of the record control unit 322 from when the initial processing after starting the shovel 100 is completed to when the shovel 100 stops, as described above. One or more captured images with the determination information IM2 recorded in the storage unit 324 are transmitted to the management device 200 through the communication device 90 at the predetermined image transmission timing.

<Configuration of the Management Device>

The management device 200, as in the above-described example, includes the control device 210, the communication device 220, the display device 230, and the input device 240, and the control device 210 includes the teaching data generating unit 2102, the learning unit 2103, and the storage units 2104 and 2105. That is, unlike the example illustrated in FIG. 3, the determining unit 2101 is omitted in the present example.

The teaching data generating unit 2102 generates the teaching data used by the learning unit 2103 to perform additional learning on the learned model LM, based on the multiple captured images with the determination information IM2 received from the multiple shovels 100 through the communication device 220 and stored in the storage unit 2104.

For example, the teaching data generating unit 2102 displays the captured image and the determination information included in the captured image with the determination information IM2 side by side. This allows an administrator or an operator of the management device 200 to select a combination corresponding to incorrect determination from combinations of the captured images and corresponding determination information (i.e., determined results) displayed on the display device 230 through the input device 240. Then, an administrator, an operator, or the like can create the additional learning teaching data representing a combination of a captured image corresponding to the combination of the incorrect determination and a correct answer to be output from the learned model LM in response to the captured image being input by using the input device 240 to operate the teaching data creation GUI. In other words, the teaching data generating unit 2102 can generate multiple additional learning teaching data (i.e., the additional learning teaching data set) in accordance with an operation (work) performed by an administrator, an operator, or the like for the captured image, selected from the multiple captured images, corresponding to the incorrect determination in the learned model LM. In the present example, it is not necessary to perform a process of inputting multiple captured images received from the multiple shovels 100 into the learned model LM and obtaining determined results on a management device 200 side, thereby improving the processing efficiency related to the additional learning.

[Further Another Example of the Configuration of the Shovel Assist System]

Next, with reference to FIG. 8, further another example of the configuration of the shovel assist system SYS according to the present embodiment will be described.

Figure 8:
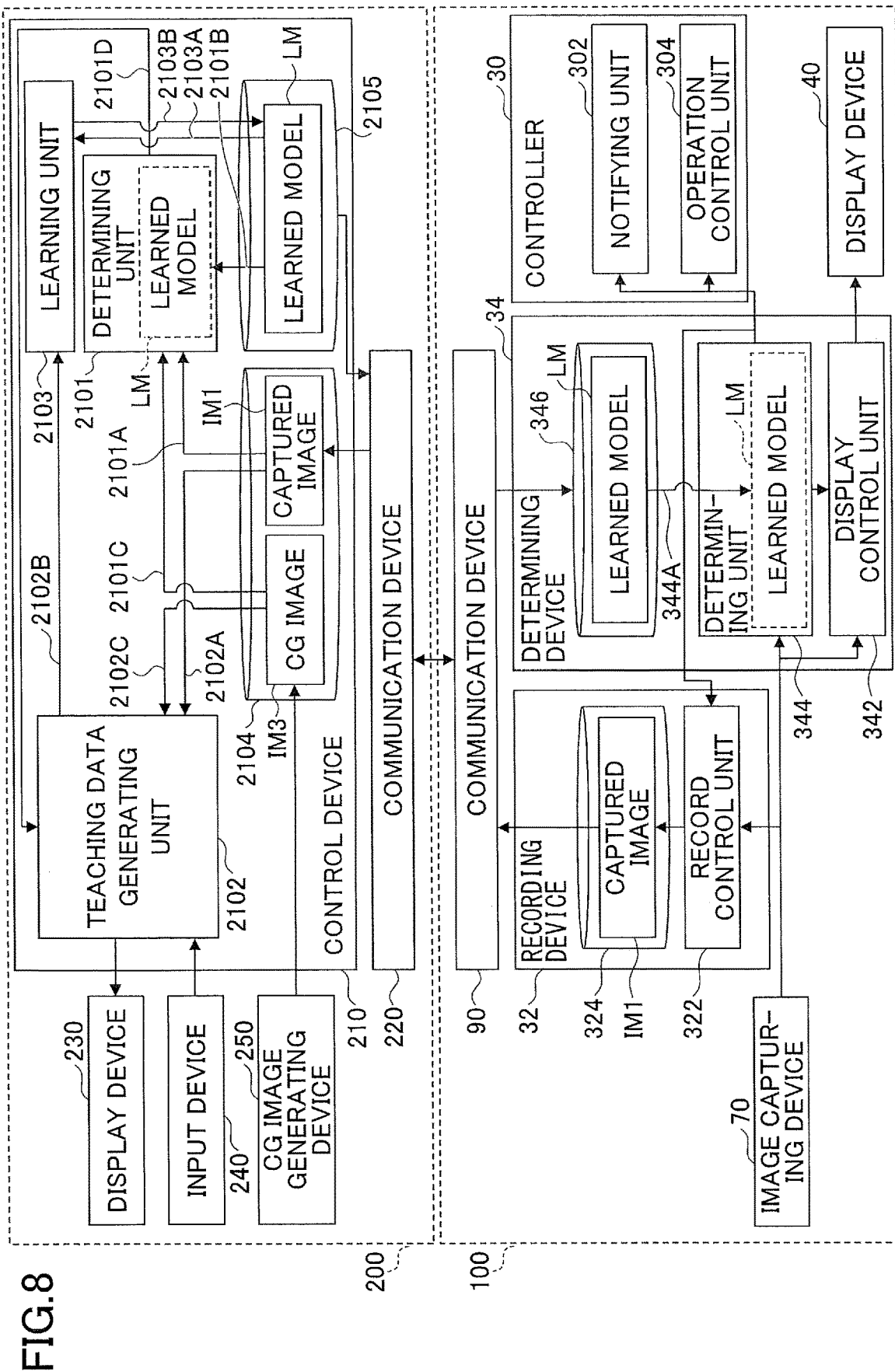
FIG. 8 is a functional block diagram illustrating still another example of the functional configuration of the shovel assist system.

FIG. 8 is a functional block diagram illustrating further another example of the functional configuration of the shovel assist system SYS according to the present embodiment. In the following, in the present example, a part different from the above-described example (FIG. 3) will be mainly described.

<Configuration of the Management Device>

The management device 200 includes the control device 210, the communication device 220, the display device 230, the input device 240, and a computer graphic generating device 250 (hereinafter referred to as a "CG image generating device").

The CG image generating device 250 generates a computer graphic (hereinafter, referred to as a "CG image") IM3 representing surroundings of the shovel 100 at a work site in accordance with an operation performed by an operator of the management device 200 or the like. For example, the CG image generating device 250 is mainly configured by a computer including, for example, the memory device such as the CPU and the RAM, the auxiliary storage device such as the ROM, the interface device for various inputs and outputs, and the like, and application software that enables an operator or the like to create the CG image IM3 is pre-installed. An operator or the like creates the CG image IM3 on the display screen of the CG image generating device 250 through a predetermined input device. This enables the CG image generating device 250 to generate the CG image IM3 representing surroundings of the shovel 100 at a work site in accordance with a work (i.e., an operation) performed by an operator of the management device 200. Additionally, the CG image generating device 250 may generate the CG image IM3 corresponding to a meteorological condition corresponding to the captured image, a meteorological condition different from the sunshine condition, a working environment in the sunshine condition, or the like based on the captured image (e.g., the captured image IM1) of actual surroundings of the shovel 100. The CG image IM3 generated by the CG image generating device 250 is obtained by the control device 210.

Here, the CG image IM3 may be generated (created) outside of the management device 200.

As in the above-described example, the control device 210 includes the determining unit 2101, the teaching data generating unit 2102, the learning unit 2103, and the storage units 2104 and 2105.

The determining unit 2101 performs determination related to an object around the shovel 100 based on the multiple captured images IM1 read from the storage unit 2104 (i.e., the path 2101A) and the multiple CG images IM3 read from the storage unit 2104 (i.e., the path 2101C) by using the learned model LM, stored in the storage unit 2105, on which machine learning has been performed by the learning unit 2103. Specifically, the determining unit 2101 loads the learned model LM from the storage unit 346 to the main storage device such as the RAM (i.e., the path 2101B) and performs determination related to an object around the shovel 100 based on the captured images IM1 and the CG images IM3 read from the storage unit 2104 by the CPU executing the learned model LM. More specifically, the determining unit 2101 performs determination related to an object around the shovel 100 by sequentially inputting the multiple captured images IM1 and the multiple CG images IM3 stored in the storage unit 2104 into the learned model LM. The results 2101D determined by the determining unit 2101 are input to the teaching data generating unit 2102. At this time, the determined results 2101D may be sequentially input to the teaching data generating unit 2102 for each of the multiple captured images IM1 and CG images IM3, or may be input to the teaching data generating unit 2102 after being compiled into a list or the like, for example.

The teaching data generating unit 2102 generates teaching data used by the learning unit 2103 to perform machine learning on the learning model based on the multiple captured images IM1 received from the multiple shovels 100 and the CG images generated by the CG image generating device 250 (stored in the storage unit 2104).

For example, the teaching data generating unit 2102 reads the captured images IM1, received from the multiple shovels 100, and the CG images IM3, generated by the CG image generating device 250, from the storage unit 2104 (i.e., the paths 2102A and 2102C) and, together with display of the captured images IM1 and the CG images IM3 on the display device 40, displays the teaching data creation GUI. An administrator, an operator, or the like creates the teaching data in a format according to an algorithm of the learning model by using the input device 240 to operate the teaching data creation GUI to instruct correct answers corresponding to the respective captured images IM1 or the respective CG images IM3. In other words, the teaching data generating unit 2102 can generate multiple teaching data (i.e., the teaching data set) in accordance with an operation (a work) performed by an administrator or an operator on the multiple captured images IM1 and CG images IM3.

The teaching data generating unit 2102 generates the teaching data for the learning unit 2103 to perform additional learning on the learned model LM based on the multiple captured images IM1 received from the multiple shovels 100 and the CG images IM3 generated by the CG image generating device 250 (stored in the storage unit 2104).

The teaching data generating unit 2102 reads the multiple captured images IM1 and the multiple CG images IM3 from the storage unit 2104 (i.e., the paths 2102A and 2102C) and displays each of the captured images IM1 or the CG images IM3 and the results determined by the determining unit 2101 (using the learned model LM) (i.e., the output results) corresponding to the respective captured images IM1 or the respective CG images IM3 side by side on the display device 230. This enables an administrator or an operator of the management device 200 to select a combination corresponding to the incorrect determination from combinations of the captured images IM1 or the CG images IM3 displayed on the display device 230 and corresponding results determined by using the learned model LM, through the input device 240. An administrator, an operation, or the like can create the additional learning teaching data representing a combination of the captured image IM1 or the CG image IM3 corresponding to the combination of the incorrect determination and a correct answer to be output by using the learned model LM in response to the captured image IM1 or the CG image IM3 being input, by using the input device 240 to operate the teaching data creation GUI. In other words, the teaching data generating unit 2102 can generate multiple additional learning teaching data (i.e., the additional learning teaching data set) in accordance with an operation (a work) performed by an administrator, an operator, or the like for at least one of the captured image IM1 or the CG image IM3, selected from the multiple captured images IM1 and CG images IM3, corresponding to the incorrect determination in the learned model LM. This can generate the teaching data by using the CG image IM3 in addition to the captured image IM1 collected from the multiple shovels 100, thereby providing the teaching data sufficiently. In particular, in the CG image IM3, various work site conditions, that is, various environmental conditions can be virtually created. Therefore, by using the CG image IM3 to generate the teaching data set, the learned model LM can achieve the relatively high determination accuracy under various work site conditions at an earlier timing.

Here, because the CG image IM3 generated by the CG image generating device 250 is artificially created, the presence or absence, the position, and the like of a monitoring target object, such as a person, a truck, a pylon, or a utility pole in the CG image IM3 are already known. That is, a correct answer to be output by the learned model LM in response to the CG image IM3 being input is already known. Thus, the CG image generating device 250 can output, with the CG image IM3, data related to a correct answer to be output by the learned model LM in response to the CG image IM3 being input (hereinafter, referred to as "correct answer data") to the control device 210. Therefore, the control device 210 (i.e., the teaching data generating unit 2102) can automatically extract the incorrect determination in a determining process performed by using the learned model LM (i.e., by the determining unit 2101) in response to the CG image IM3 being input based on a correct answer data input from the CG image generating device 250, and automatically generate multiple teaching data (i.e., the teaching data set) for additional learning, representing a combination of the CG image IM3 corresponding to the extracted incorrect determination and a correct answer to be output by the learned model LM in response to the CG image IM3 being input. The learning unit 2103 can perform additional learning on the learned model LM, such as the above described back propagation, based on the teaching data automatically generated by the teaching data generating unit 2102. That is, the control device 210 can automatically generate the additionally learned model based on the CG image IM3 and the correct answer data generated by the CG image generating device 250.

[Effect]

Next, the effect of the shovel assist system SYS according to the present embodiment described above will be described.

In the present embodiment, the image capturing device 70 obtains a captured image of surroundings of the shovel 100 on which the image capturing device 70 is mounted (hereinafter, referred to as the "shovel"). The determining unit 344 performs determination related to an object around the shovel based on the captured image IM1 obtained by the image capturing device 70 by using the learned model LM on which machine learning has been performed. The learned model LM is updated to the additionally learned model on which additional learning has been performed based on the obtained environmental information, specifically, the teaching data generated from the image captured by the image capturing device 70, obtained by the shovel and another shovel 100 (hereinafter referred to as "another shovel"), and the determining unit 344 performs the determination, in a case where the learned model LM has been updated, by using the updated learned model LM based on the captured image obtained by the image capturing device 70.

Specifically, the teaching data generating unit 2102 of the management device 200 generates the teaching data based on the captured image IM1 received from the shovel 100 that is obtained by the shovel 100. The learning unit 2103 of the management device 200 performs additional learning on a learned model identical to the learned model used to perform the determination related to a surrounding object at the shovel 100 (that is, the learned model LM) based on the teaching data generated by the teaching data generating unit 2102 to generate the additionally learned model. The communication device 220 of the management device 200 transmits the additionally learned model on which additional learning has been performed by the learning unit 2103 to the shovel 100 and updates the learned model LM of the shovel 100 with the additionally learned model.

This updates the learned model LM of the shovel 100 with the additionally learned model on which additional learning has been performed using the teaching data generated from the image captured by the image capturing device 70, that is obtained under various environments by the shovel or another shovel. Thus, the shovel 100 can improve the determination accuracy under various environmental conditions in a case of performing determination related to an object around the shovel 100 based on the environmental information (i.e., the image captured by the image capturing device 70) around the shovel 100.

Here, the shovel 100 that obtains the captured image of the surroundings, which will be a source of the teaching data (i.e., an example of a second shovel) may be different from the shovel 100 that performs determination related to the surrounding object based on the captured image by using the learned model LM (i.e., an example of a first shovel). In this case, the image capturing device 70 of the former shovel 100 (i.e., an example of a second environmental information obtaining unit) obtains the captured image of the surroundings of the shovel 100, used to generate the teaching data, and the image capturing device 70 of the latter shovel 100 (i.e., an example of a first environmental information obtaining unit) obtains the captured image of the surroundings of the shovel 100, used to determine the surrounding objects. For example, the management device 200 may be configured to collect the captured images of the surroundings from one or more shovels different from the shovel 100 that does not have a function of performing determination related to an object (i.e., an example of the second shovel), generate and update the learned model LM, and transmit the learned model LM to the shovel 100 (i.e., an example of the first shovel). That is, the learned model LM used by the shovel 100 (i.e., the determining unit 344) to perform determination related to an object around the shovel 100 may be updated to the additionally learned model on which additional learning has been performed based on the teaching data generated from the environmental information (specifically, the captured image of the surroundings) obtained by at least one of the shovel or another shovel different from the shovel.

In the present embodiment, each of the multiple shovels 100 including the shovel includes the identical learned model LM, and uses the learned model LM to perform determination related to a surrounding object. That is, there are multiple shovels 100 (i.e., examples of the first shovel) that perform determination related to the surrounding object by using the learned model LM based on the surrounding environmental information (i.e., the image captured by the image capturing device 70). Then, the learned model LM included in each of the multiple shovels 100 may be updated to the identical additionally learned model generated by the management device 200.

Thereby, relatively high determination accuracy can be uniformly achieved under various environmental conditions in the multiple shovels 100.

In the present embodiment, the learned model LM may be updated to the additionally learned model on which additional learning has been performed based on the teaching data generated from captured images of the surroundings obtained by the multiple shovels 100. That is, there are multiple shovels 100 (i.e., examples of a second shovel) that obtain the surrounding environmental information (i.e., the image captured by the image capturing device 70) used to generate the teaching data.

This allows the captured images from the multiple shovels 100 to be utilized, so that teaching data can be prepared for a greater variety of environments. Thus, the shovel 100 can further improve the determination accuracy under various environmental conditions based on the environmental information (i.e., the image of the image capturing device 70) around the shovel 100 in a case of performing determination related to an object around the shovel 100.

Here, the learned model LM may be updated to the additionally learned model on which additional learning has been performed based on the teaching data generated from the captured image of the surroundings, obtained by the single shovel 100. That is, the shovel 100 (i.e., an example of the second shovel) that obtains the surrounding environmental information (i.e., the image captured by the image capturing device 70) used to generate the teaching data may be a single shovel.

In the present embodiment, the record control unit 322 records the captured image as the environmental information obtained by the image capturing device 70 at a predetermined recording timing. The learned model LM of the shovel 100 is then updated to the additionally learned model on which additional learning has been performed based on the teaching data generated from the captured image recorded by the record control unit 322 in the management device 200.

This can selectively record a captured image having an appropriate quality for use of the teaching data (e.g., images captured under operating conditions where incorrect determination is likely to occur, images captured when incorrect determination may specifically occur, and the like, that are to be applied to the additional learning). Thus, the learned model LM can be prevented from overfitting or the like, thereby further improving the determination accuracy related to an object around the shovel 100.

In the present embodiment, the predetermined recording timing may be when the shovel turns or the shovel travels.

This can specifically record an image captured while the shovel 100 turns or the shovel 100 travels as an operating condition in which incorrect determination is likely to occur, which is to be applied to the additional learning.

In the present embodiment, the determining unit 344 performs determination related to the detection of the object around the shovel. The predetermined recording timing may be when the determining unit 344 determines that the object around the shovel is detected.

This can record the captured image at a timing when incorrect determination related to the detection of an object around the shovel, that is, incorrect detection may occur.

[Modification and Improvement]

Although the embodiments have been described in detail above, the present disclosure is not limited to such particular embodiments, and various modifications and alterations can be made without departing from the scope of the claims.

For example, in the embodiments described above, the environmental information around the shovel 100 as input information for the learned model LM is an image captured by the image capturing device 70, but the present disclosure is not limited to such embodiments. Specifically, the input information for the learned model LM may be, for example, output information (distance image data, spectral data of reflected waves, and the like) from any spatial recognition sensor (i.e., an example of an environmental information obtaining unit), such as light detecting and ranging (LIDAR), a millimeter wave radar, or a distance image sensor, mounted on the shovel 100. In this case, the management device 200 performs machine learning on the learning model and additional learning on the learned model LM based on the teaching data, received from the multiple shovels 100, generated from the output information of the spatial recognition sensor.

Further, in the above-described embodiments and modified examples, the single learned model LM is generated and determination related to an object around the shovel 100 is performed in the single learned model LM, but the present disclosure is not limited to such embodiments. Specifically, a learned model may be generated for each of multiple environmental conditions around the shovel 100 that are previously defined, and after a learned model is selected in accordance with the environmental condition around the shovel 100, determination related to the object around the shovel 100 may be performed using the selected learned model. At this time, the environmental conditions around the shovel 100 may include, for example, weather conditions such as rain, sunny weather, and cloudy weather, a type of background reflected in the captured image (e.g., geographical conditions such as residential districts where houses are reflected, mountainous areas where a forest is reflected, and conditions of the presence or absence of paving), and the like. This allows additional learning to be performed on the learned model in accordance with respective environmental conditions, so that the shovel can improve the determination accuracy for respective environmental conditions.

Although, in the above-described embodiments and modified examples, a learned model LM to which a machine learning technique based on a neural network has been applied is generated, another machine learning technique may be applied instead of or in addition to the neural network.

Figure 9:
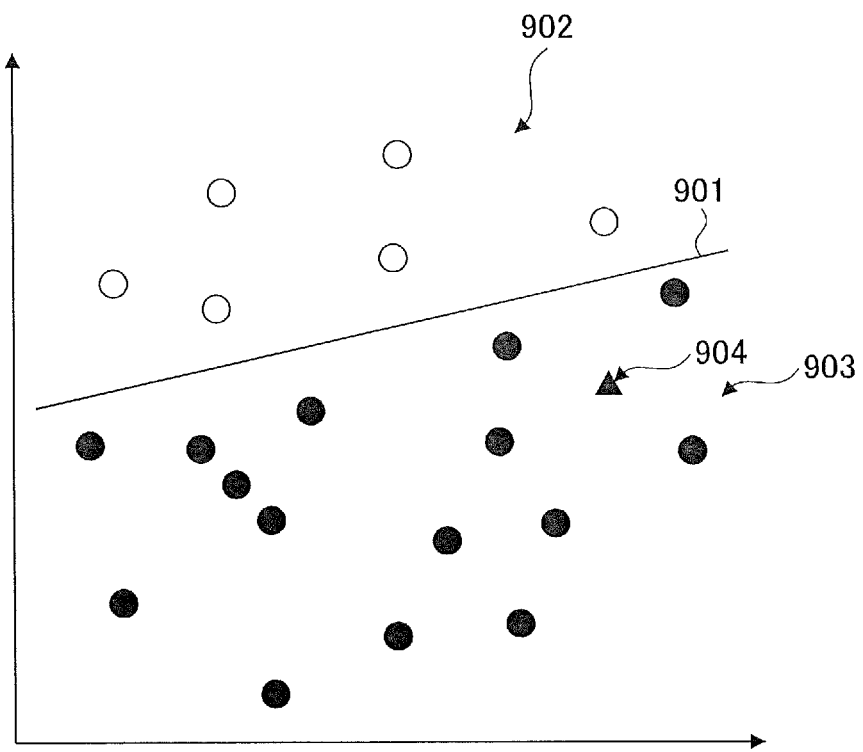
FIG. 9 is a schematic drawing illustrating another example of the determining process performed by the determining unit.

For example, FIG. 9 is a schematic drawing illustrating another example of the determining process performed using the learned model LM. Specifically, FIG. 9 is a schematic drawing illustrating a method of performing determination related to an object when a support vector machine (SVM) is applied as a machine learning technique.

As illustrated in FIG. 9, two-dimensional vector information (hereinafter, a "feature vector") of a predetermined feature extracted from environmental information obtained by shovel 100 (e.g., the image captured by the image capturing device 70) around the shovel 100 is plotted as teaching data on a two-dimensional plane.

For example, it is assumed that a feature vector group 902 (i.e., a plot group of white circles in the drawing) and a feature vector group 903 (i.e., a plot group of black circles in the drawing) respectively correspond to environmental information observed when no object is present and environmental information observed when an object is present. Then, the SVM method can define a separating line 901 between the feature vector group 902 and the feature vector group 903 plotted with black circles that are the teaching data. Thus, by using the separating line 901, a feature vector is calculated from the environmental information obtained by the shovel 100, and whether the calculated feature vector is on the feature vector group 902 side or the feature vector group 903 side from the separating line 901 is determined, so that determination related to the presence or absence of an object, that is, detection of an object can be performed. For example, because a feature vector 904 is on the feature vector group 903 side from the separating line 901, an object can be detected by determining the presence of the object based on the environmental information obtained by the shovel 100. In a similar manner, the detected object can be classified (i.e., classification into a particular type of object and another type of object).

Specifically, as the feature vector, for example, an image feature of the image captured by the image capturing device 70, such as a feature of the histogram of oriented gradients (HOG), a feature of the local binary pattern (LBP), or the like, is used. Additionally, because the feature vector is generally specified in a multi-dimensional space exceeding three dimensions, a separating hyperplane is defined by the SVM method, if a multi-dimensional space corresponding to the feature vector is classified into the presence and absence of an object or into a particular type of object (e.g., a "person") and another type of object.

Thus, by applying the SVM method, the management device 200 generate feature vectors as teaching data from multiple environmental information collected from the multiple shovels 100, and, based on the teaching data, the management device 200 can define a separating hyperplane corresponding to the learned model LM. After the management device 200 defines the separating hyperplane, the management device 200 may further generate a feature vector as additional teaching data from the environmental information collected from the multiple shovels 100 to update the separating hyperplane based on the previous teaching data and the additional teaching data. Similarly with the above-described embodiment, this enables the shovel 100 to improve the determination accuracy under various environmental conditions in a case of performing determination related to an object around the shovel 100 based on the environmental information around the shovel 100.

In addition to the neural network and the SVM, other machine learning techniques, such as decision tree techniques such as random forests, nearest neighbor algorithms, simple Bayesian classifiers, and the like, may be applied.

In the above-described embodiments and modified examples, the shovel 100 performs determination related to a surrounding object by using the learned model LM. However, another construction machine may perform determination related to a surrounding object by using the learned model LM. That is, the shovel assist system SYS according to the above-described embodiments may be configured to include another construction machine, such as road machines, such as bulldozers, wheel loaders, and asphalt finishers, and forestry machines including harvesters and the like, instead of or in addition to the shovel 100.

What is claimed is:

1. A shovel comprising:
an actuator;
a processor; and
a memory storing program instructions that cause the processor to:
obtain environmental information around the shovel; and
perform determination related to an object around the shovel based on the obtained environmental information, by using a learned model on which machine learning has been performed, the object including a person;
wherein the learned model is updated to an additionally learned model on which additional learning has been performed based on teaching information generated from the obtained environmental information;
wherein, in a case where the learned model is updated, the processor performs the determination based on the obtained environmental information, by using the updated learned model,
wherein the actuator is controlled based on the determination,
wherein a plurality of shovels including the shovel include the identical learned model and perform the determination by using the learned model,
wherein the learned model included in each of the plurality of shovels is updated to the additionally learned model, and
wherein the teaching information is generated from additional environmental information selected among the obtained environmental information based on a result of the determination.

2. The shovel as claimed in claim 1, wherein the learned model is updated to the additionally learned model on which the additional learning has been performed based on the teaching information generated from the environmental information obtained by at least one of the shovel or another shovel different from the shovel.

3. The shovel as claimed in claim 1, wherein the learned model is updated to the additionally learned model on which the additional learning has been performed based on the teaching information generated from the environmental information around the plurality of shovels, the environmental information being obtained at the plurality of shovels.

4. The shovel as claimed in claim 1,
wherein the instructions cause the processor to further record the environmental information obtained at a predetermined timing, and
wherein the learned model is updated to the additionally learned model on which the additional learning has been performed based on the teaching information generated from the recorded environmental information.

5. The shovel as claimed in claim 4, wherein the predetermined timing is when the shovel turns or the shovel travels.

6. The shovel as claimed in claim 4,
wherein the processor performs the determination related to detection of the object around the shovel, and
wherein the predetermined timing is when the processor determines that the object around the shovel is detected.

7. The shovel as claimed in claim 1, further comprising:
a controller configured to control the actuator based on the determination.

8. The shovel as claimed in claim 1, further comprising:
an operating device,
wherein the actuator is driven based on an operation performed on the operating device, and
wherein, in a case where it is determined that the object is present within a predetermined range around the shovel based on the determination, the actuator is not driven even if the operating device is operated.

9. The shovel claimed in claim 1, wherein the processor performs the determination related to a motion content of the object by using the learned model based on the environmental information obtained sequentially in time.

10. The shovel as claimed in claim 1, wherein the teaching information is generated by identifying that the result of the determination performed by the learned model based on the environmental information is incorrect.

11. The shovel as claimed in claim 1, wherein the teaching information is generated from the additional environmental information selected among the obtained environmental information by an operator of the shovel based on the result of the determination.

12. The shovel as claimed in claim 1, wherein the determination relates to states of the person, the states including sitting, standing, or lying.

13. The shovel as claimed in claim 1, wherein the determination relates to a state of a part of the person.

14. A shovel assist system, comprising:
a first shovel;
a second shovel; and
an external device configured to communicate with the first shovel and the second shovel,
wherein the first shovel includes
an actuator;
a processor; and
a memory storing program instructions that cause the processor to:
obtain environmental information around the first shovel; and
perform determination related to an object around the first shovel based on the obtained environmental information around the first shovel, by using a learned model on which machine learning has been performed, the object including a person;
wherein the second shovel includes
a processor; and
a memory storing program instructions that cause the processor to:
obtain environmental information around the second shovel;
record the obtained environmental information around the second shovel; and
transmit the recorded environmental information to the external device; and
wherein the external device includes
a processor; and
a memory storing program instructions that cause the processor to:
generate teaching information based on the environmental information around the second shovel, received from the second shovel;
perform additional learning on a learned model identical to the learned model used to perform the determination at the first shovel, based on the generated teaching information, to generate an additionally learned model; and
transmit, to the first shovel and the second shovel, the additionally learned model on which the additional learning has been performed,
wherein the learned model is updated to the additionally learned model received from the external device at the first shovel,
wherein the determination is performed, in a case where the learned model is updated, by using the updated learned model, based on the obtained environmental information around the first shovel,
wherein the actuator is controlled based on the determination at the first shovel,
wherein the learned model is updated to the additionally learned model received from the external device at the second shovel, and
wherein the teaching information is generated from additional environmental information selected among the obtained environmental information based on a result of the determination.

15. The shovel assist system claimed in claim 14, wherein the first shovel is the second shovel.

16. The shovel assist system claimed in claim 14, comprising a plurality of said first shovels, wherein the external device communicates with the plurality of first shovels.

17. The shovel assist system claimed in claim 14, comprising a plurality of said second shovels, wherein the external device communicates with the plurality of second shovels.

18. The shovel assist system claimed in claim 14, wherein the processor performs the determination related to a motion content of the object by using the learned model based on the environmental information obtained sequentially in time.

19. A machine learning device comprising:
a processor; and
a memory storing program instructions that cause the processor to:
perform machine learning on a learning model to generate a learned model based on a data set, the data set being a combination of environmental information in a work site where a shovel is disposed and a correct answer to be output by the learning model in response to the environmental information being input to the learning model, and
update the learned model to an additionally learned model on which additional learning has been performed based on teaching information generated from surrounding environmental information obtained by a plurality of shovels,
wherein the plurality of shovels include the identical learned model and perform determination related to an object around the shovel based on the environmental information, by using the learned model, the object including a person,
wherein the learned model included in each of the plurality of shovels is updated to the additionally learned model, and wherein the teaching information is generated from additional environmental information selected among the environmental information based on a result of the determination.

* * * * *